(12) United States Patent
Minowa et al.

(10) Patent No.: US 7,155,452 B2
(45) Date of Patent: Dec. 26, 2006

(54) SYSTEM, METHOD, APPARATUS, AND PROGRAM FOR PROVIDING ELECTRONIC MANUAL

(75) Inventors: Kiyohisa Minowa, Tokyo (JP); Haruo Hamaguchi, Tokyo (JP); Atsushi Hanai, Kanagawa (JP); Eiji Shinohara, Kanagawa (JP); Tatsuto Torikai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 918 days.

(21) Appl. No.: 09/984,474

(22) Filed: Oct. 30, 2001

(65) Prior Publication Data

US 2002/0055922 A1 May 9, 2002

(30) Foreign Application Priority Data

Nov. 7, 2000 (JP) ............................. 2000-338927

(51) Int. Cl.
- *G06F 7/00* (2006.01)
- *G06F 17/00* (2006.01)
- *G06F 3/00* (2006.01)
- *G06F 9/00* (2006.01)

(52) U.S. Cl. .................. 707/104.1; 715/764; 715/809; 715/811

(58) Field of Classification Search .................. 703/21, 703/22; 705/44; 707/104.1; 715/764, 809, 715/811

See application file for complete search history.

(56) References Cited

U.S. PATENT DOCUMENTS

| | | | | |
|---|---|---|---|---|
| 5,740,425 A | * | 4/1998 | Povilus | ...................... 707/100 |
| 5,768,528 A | | 6/1998 | Stumm | |
| 5,950,173 A | * | 9/1999 | Perkowski | ..................... 705/26 |
| 6,035,305 A | * | 3/2000 | Strevey et al. | ........... 707/104.1 |
| 6,098,071 A | | 8/2000 | Aoyama et al. | |
| 6,377,956 B1 | * | 4/2002 | Hsu et al. | ................ 707/104.1 |
| 2001/0034609 A1 | * | 10/2001 | Dovolis | ........................ 705/1 |
| 2006/0015462 A1 | * | 1/2006 | Doll-Steinberg | ............. 705/51 |

FOREIGN PATENT DOCUMENTS

| | | |
|---|---|---|
| EP | 0 901 072 | 3/1999 |
| EP | 1 028 386 | 8/2000 |

OTHER PUBLICATIONS

Moseley, L. et al. Mastering Microsoft® Office 97 Professional Edition. 2nd Ed. © 1997 Sybex Inc. ISBN 0-7821-1925-5. pp. 239-240, 360-361, and 1124-1128.*
Matloff, N. "File Systems in Unix." Oct. 19, 1998. http://heather.cs.ucdavis.edu/~matloff/UnixAndC/Unix/FileSyst.html.*
European Office Action dated Apr. 22, 2005, directed to counterpart foreign application.

* cited by examiner

*Primary Examiner*—Paul Rodriguez
*Assistant Examiner*—Ayal Sharon
(74) *Attorney, Agent, or Firm*—Morrison & Foerster LLP

(57) ABSTRACT

When a customer operates a terminal to send a request for a provision of a manual page to the center via the Internet, the center determines whether the customer who is accessing is a registered customer (user of a copier) based on the stored customer information. In a case where the customer who is accessing the center is a registered customer, the center automatically selects electronic manual file(s) for the copier being used by the customer concerned. And the center generates a manual page representing the content of the selected manual file so that the content of the manual file is noticeable rather than the other information. The center transmits the manual page to the terminal concerned.

22 Claims, 20 Drawing Sheets

| CORPORATE ID | CURRENT MODEL | E-MAIL ADDRESS | PASSWORD | USER ATTRIBUTE | HISTORY |
|---|---|---|---|---|---|
| AA | A002 | a@aa.++.jp | ******* | ORDINARY USER | A001 (1999/10/30) |
| | | b@aa.++.jp | ******* | KEY OPERATOR ADMINISTRATOR | |
| | | c@aa.++.jp | ******* | | |
| | A002 | d@aa.++.jp | ******* | --- | --- |
| | | e@aa.++.jp | ******* | PURCHASER | |
| BB | C004 | a@bb.++.jp | ******* | --- | C001 (1998/05/21) |
| | | b@bb.++.jp | ******* | --- | |
| | | c@bb.++.jp | ******* | | |
| | A002 | a@cc.++.jp | ******* | ADMINISTRATOR | --- |

SYSTEM, METHOD, APPARATUS, AND PROGRAM FOR PROVIDING ELECTRONIC MANUAL

BACKGROUND OF THE INVENTION

1. Field of the Invention

The present invention relates to a system, a method, an apparatus and a program for providing an electronic manual, and particularly relates to a system, a method, an apparatus and a program for providing an electronic manual that can automatically select an electronic manual for a product which a user uses and provide the electronic manual to the user.

2. Description of the Related Art

Instead of the conventional paper based manuals (describing how to use a product or cautions), electronically written manuals (hereinafter, referred to as "electronic manual") have been used widely in view of circumstances wherein contents is getting larger in accordance with improvement of the products' performance, or demands for saving papers.

The electronic manuals are advantageous over paper based manuals. For example, it is able to distribute it via communications networks, such as the Internet, or it is easy to edit the contents.

However, in a case where electronic manuals for many products are provided through a web site, it is difficult for a user to find out a target manual instantly.

Some of electric apparatuses have display units to display electronic manuals, and the electronic manuals usually include "Trouble Shooting" for quick recovery from troubles. However, if the electric apparatus has troubles on its display unit, a user can not refer to the trouble shooting.

In a case where a user upgrades a product, the upgraded product and the former one usually share the same or similar functions. In such the case, it is troublesome for the user to find out necessary article to learn characteristic functions of the upgraded product from a full version manual.

A person who plans to buy a product, usually compares catalogs of picked-up products. Since most of such the catalogs merely present features of the products, it is difficult to imagine handling or usability of the product. In such the situation, the manual is useful to learn how to handle the product. But unfortunately, most of the manuals are unavailable before the user actually buys the product. That is, it is difficult to previously study usability of the picked-up products.

The present invention has been made in consideration of the above circumstances, and it is an object of the present invention to provide a system, a method, an apparatus, and a program for providing an electronic manual by which an electronic manual of a product being used by a customer is automatically selected and provided.

It is another object of the present invention to provide a system, a method, an apparatus, and a program for providing an electronic manual by which an electronic manual describing functional differences between target products.

SUMMARY OF THE INVENTION

To achieve the above objects, an electronic manual providing system according to a first aspect of the present invention comprises a server and a plurality of terminals connected with each other via a communication network, wherein the server comprises:

an electronic manual storage unit which stores electronic manual information sets each of which describes the contents of a manual of a product;

a request receiver which receives request information for requesting a provision of an electronic manual from each the terminal via the communications network;

a customer information memory which stores customer information regarding a customer in association with product information representing a product being used by the customer;

a customer identifier which determines whether a sender of request information received by the request receiver is a customer registered in the customer information, based on the customer information stored in the customer information memory;

a manual selector which selects the electronic manual information sets of a product represented by product information stored in association with the customer information from the electronic manual storage unit, in a case where the customer identifier determines that the sender of the request information is the customer registered in the customer information; and a manual provider which provides the electronic manual information sets selected by the manual selector to each the terminal via the communications network.

According to this structure, in a case where a person who wants an electronic manual, which describes the contents of a manual for a product, is determined as a registered customer, the electronic manual for the product being used by that customer is automatically selected, and the customer is provided with the selected manual. Therefore, users can easily obtain an electronic manual of a product being used by him/her.

In the above electronic manual providing system, the manual provider may provide the electronic manual information sets selected by the manual selector to each the terminal so that the information representing the electronic manual is noticeable rather than other information.

According to this structure, the selected electronic manual is presented so that the information representing the manual is noticeable rather than the other information. For example, to display the manual of the product concerned above the other information (such as manual information for another product), or to display the manual information with colors being different from those for the other information. Therefore, the customer can more easily obtain the electronic manual of the product being used by him/her.

In the above electronic manual providing system, the customer information may include history information representing purchase history, and the manual selector may select electronic manual information sets regarding differences between the product being used by the customer and the former product based on the history information.

According to this structure, the customer who bought a new model is provided with manual information specialized in different functions from those of the former model. Therefore, it is helpful for the customer to quickly master how to operate the new model. Since only necessary and sufficient information is transmitted, connection time for browsing an electronic manual is reduced.

In the above electronic manual providing system, the customer identifier may receive information representing a product desired by the customer, and the manual selector may select the electronic manual information sets regarding differences between the customer's desired product represented by the information received by the customer identifier and the product being used by the customer.

According to this structure, for example, in a case where a customer plans to buy another product, an electronic manual regarding differences between the product desired by the customer and the product being used by the customer is automatically selected, and the customer is provided with the differential manual just inputting information specifying the product (such as the product name, model number and the like) he/she desires. Therefore, the customer will be provided with a necessary, sufficient, and useful material information for consideration.

In the above electronic manual providing system, the customer information may include attribute information representing attribute of the customer with respect to the product being used by the customer, and the manual selector may retrieve the electronic manual information sets for a specified product, and may further select the electronic manual information sets from the retrieved electronic manual information sets based on the attribute information.

According to this structure, the electronic manuals corresponding to the skill level of the user are selected and provided to the user. For example, the users may be classified into some skill levels such as "Ordinary User" who knows merely fundamental functions of the product, "Advanced User" who is skilled in handling the product, and the like. The server determines the skill level of the user who is accessing the server, and automatically selects the manual files in accordance with the determined skill level. For example, the server selects basic level manual files for the "Ordinary User", while selecting advanced level manual files for the "Advanced User". Since only the files corresponding to the user's skill level are transferred, the user obtains necessary files and connection time is reduced.

In the above electronic manual providing system, the communications network may be the Internet.

With the use of the Internet, the customers can easily obtain manual information. Additionally, the user can obtain the electronic manual through a terminal such as a personal computer or the like being connected to the Internet. In this case, the user can refer to "Trouble Shooting" even if a product which displays the electronic manual information has troubles.

To achieve the above objects, an electronic manual providing system according to a second aspect of the present invention comprises:

electronic manual storage means for storing electronic manual files each of which represents the contents of a manual for a product;

manual request reception means for receiving request information for requesting the electronic manual files stored in the electronic manual storage means;

requester specification means for specifying a sender of the request information received by the manual request reception means;

manual file retrieval means for retrieving the electronic manual files for a product used by a requester specified by the requester specification means, from the electronic manual storage means; and manual sending means for sending the electronic manual file retrieved by the manual file retrieval means to the requester.

According to this structure, electronic manual information representing the contents of a manual for a desired product is provided via a communications network. Therefore, a person who plans to buy a product is provided with a useful material information for consideration before purchase.

To achieve the above objects, an electronic manual providing method according to a third aspect of the present invention comprises:

an electronic manual storing step of storing electronic manual information sets each of which electronically describes a manual for a product;

a customer information managing step of managing customer information regarding a customer in association with product information representing a product being used by the customer;

a request receiving step of receiving request information for requesting the electronic manual of a product via a communications network;

a customer identifying step of determining whether a sender of the request information received in the request receiving step is the customer registered in the customer information;

an electronic manual selecting step of selecting the electronic manual information sets representing the contents of the manual for the product being associated with the customer information, from the electronic manual information stored at the electronic manual storing step when it is determined at the customer identifying step that the sender of the request information is the customer; and an electronic manual providing step of providing the electronic manual information sets selected at the electronic manual selecting step, to a terminal which is the source of the request information via the communication network.

In the above method, the electronic manual providing step may provide the electronic manual information to the terminal so that the information representing the contents of the manual is noticeable rather than the other information.

In the above method, the customer information may include information representing history information representing purchase history, and the electronic manual selecting step may select the electronic manual sets regarding differences between the product being used by the customer and a former product based on the history information.

In the above method, the customer identifying step may receive information representing a product desired by the customer, and the electronic manual selecting step may select an electronic manual regarding differences between the product represented by the information received at the customer identifying step and the product being used by the customer.

In the above method, the customer information may include attribute information representing attribute of the customer with respect to the product, and the electronic manual selecting step may obtains the electronic manual information sets for the specified product, and further selects the electronic manual files from the obtained electronic manual files based on the attribute information.

In the above method, the communications network may be the Internet.

To achieve the above objects, the electronic manual providing method according to a fourth aspect of the present invention comprises:

an electronic manual generating step of generating electronic manual information sets each which electronically represents the contents of a manual for a product;

an electronic manual storing step of storing the electronic manual information sets generated at the electronic manual generating step;

a request reception step of receiving request information for requesting the electronic manual information stored at the electronic manual storing step;

a requester specifying step of specifying a requester of the request information received at the request reception step;

a manual selecting step of selecting the electronic manual sets for a product being used by the requester specified at the requester specifying step, from the electronic information sets stored at the electronic manual storing step; and a manual providing step of providing the electronic manual information sets selected at the manual selecting step, to the requester specified at the requester specifying step.

To achieve the above objects, the apparatus according to a fifth aspect of the present invention comprises:

a connector which connects the apparatus to a terminal via a communication network;

an electronic manual storage unit which stores electronic manual information sets each of which is electronically describes the contents of a manual for a product;

a customer information memory which stores customer information regarding a customer in association with product information representing a product being used by the customer;

a manual request receiver which control the connector to receive manual request information sent from the terminal via the communications network;

a customer identifier which determines whether a sender of the manual request information received by the manual request receiver is the customer registered in the customer information;

a manual selector which selects the electronic manual information sets from the electronic manual storage unit in accordance with the manual request when the customer identifier determines that the sender of the manual request information is the customer; and a manual provider which controls the connector to provide the electronic manual information sets selected by the manual selector, to the terminal via the communications network.

In the above apparatus, the manual provider may provide the electronic manual information sets selected by the manual selector to the terminal so that the information representing the contents of the manual is noticeable rather than the other information.

To achieve the above objects, the program according to a sixth aspect of the present invention, causes a computer to function as the above apparatus.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of customer information recorded in a customer information database shown in FIG. 2;

FIG. 10 is a diagram showing an example of a form page for inputting ID information transmitted in the process flow shown in FIG. 5;

DETAILED DESCRIPTION OF THE PREFERRED EMBODIMENT

An embodiment of the present invention will now be described below with reference to the accompanying drawings.

Figure 1:
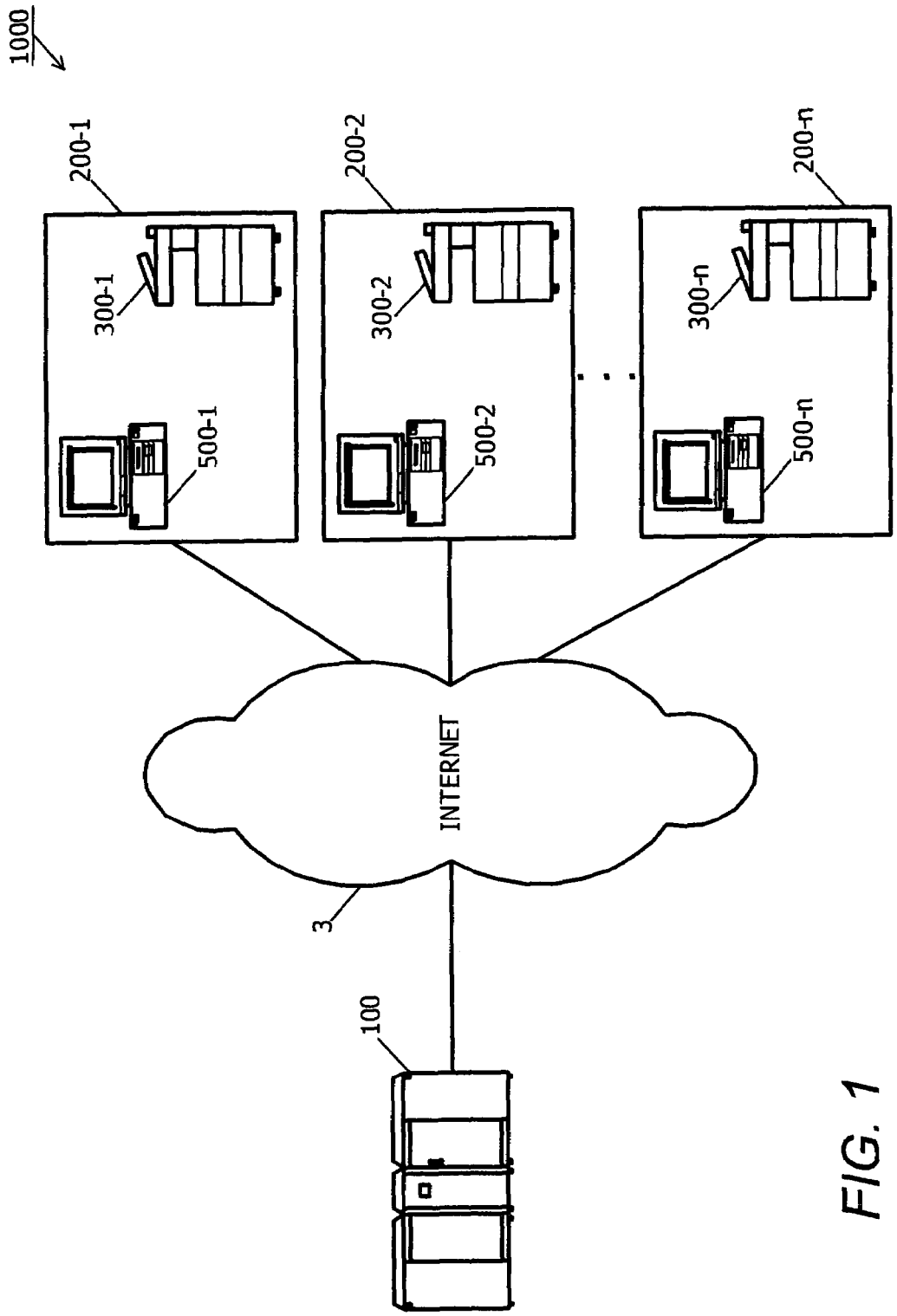
FIG. 1 is a diagram schematically showing an example of a structure of an electronic manual providing system according to an embodiment of the present invention.

FIG. 1 is a diagram schematically showing an example of the structure of the electronic manual providing system according to this embodiment of the present invention. In this embodiment, "copier" will be employed as "product" to be dealt with in the present invention.

As shown in FIG. 1, the electronic manual providing system 1000 according to this embodiment comprises a communications network 3, a center 100, a plurality of copiers 300-1 to 300-n installed in a plurality of companies 200-1 to 200-n, and a plurality of terminals 500-1 to 500-n installed in a plurality of companies 200-1 to 200-n.

The communications network 3 may be the Internet which interconnects the center 100 and the terminals 500, and transfers information therebetween. In this embodiment, the Internet will be employed as the communications network 3 (hereinafter referred to as the Internet 3). In this case, the Internet 3 is accessible via leased line, PSTN (Public Switched Telephone Networks), mobile communications network, CATV (cable television: Community Antenna Television) network, various wireless or wire communications network, or the like, or some or all of them.

The center 100 is administered by a business manufacturing and/or vending the copiers 300. The center 100 comprises a data processor such as a mainframe or a workstation.

Figure 2:
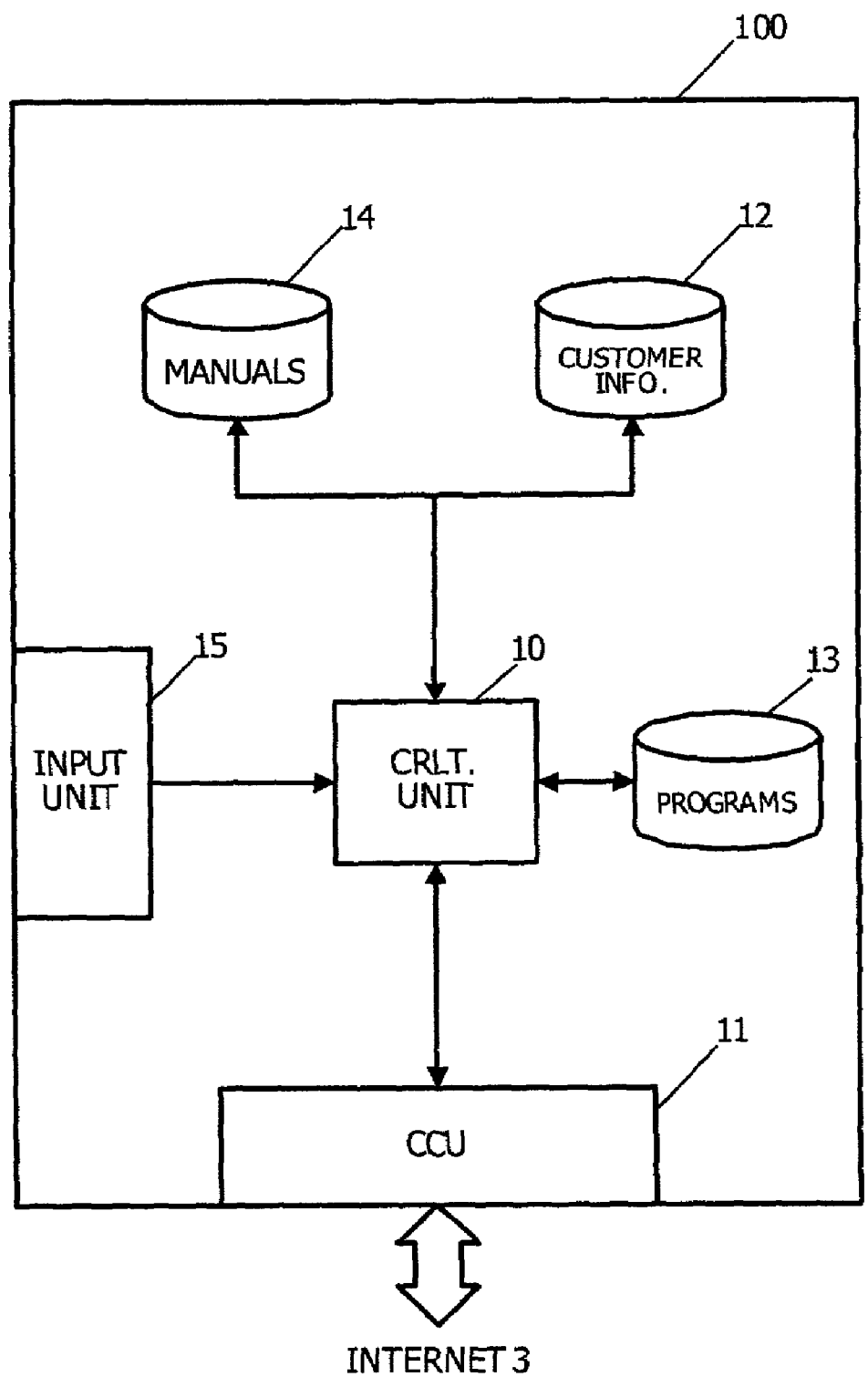
FIG. 2 is a block diagram schematically showing an example of the structure of a center shown in FIG. 1.

The structure of the center 100 will now be explained with reference to FIG. 2. FIG. 2 is a block diagram schematically showing an example of the structure of the center 100.

The center 100 comprises a control unit 10, a CCU (Communication Control Unit) 11, a customer information database 12, a program memory unit 13, a manual database 14, and an input unit 15.

The control unit 10 maybe a CPU (Central Processing Unit) which controls any components in the center 100. The control unit 10 carries out any operations described later by executing programs stored in the program memory unit 13.

The CCU 11 may be a communication device such as a router. The CCU 11 connects the center 100 to the Internet 3, and processes transmission and reception of information to/from the terminals 500.

The customer information database 12 may be a rewritable storage unit such as a hard disk drive. The customer information database 12 stores customer information. FIG. 3 is a diagram exemplifying the customer information. As shown in FIG. 3, the customer information includes "Corporate ID", "Current Model", "E-mail Address", "Password", "User Attribute", "History", and the like.

"Corporate ID" represents ID assigned to each of the companies 200;

"Current Model" represents model No. or name of the copier 300 being installed in the corresponding company 200;

"E-mail Address" and "Password" will act as user ID of users of the copier 300;

"User Attribute" represents position of the user in view of using the copier 300; and "History" represents upgrade history of the copiers, that is, indicating former models of the copier before the currently used copier 300 was introduced, and date of the latest upgrade.

Details of "User Attribute" will now be described. The users are classified into four categories, "Ordinary User", "Key Operator", "Administrator", and "Purchaser".

"Ordinary User" means users who, for example, just use the copier 300 with ordinary function (for example, just copying).

"Key Operator" means users who, for example, have advanced skill rather than "Ordinary User", that is, users who know advanced functions of the copier 300.

"Administrator" means users who, for example, can handle maintenance tasks such as toner replenishing.

"Purchaser" means users who, for example, are in charge of purchasing supplies for the copier 300 (for example, toner units, paper, and the like for replenishment), but their operation skill is the same as that of the "Ordinary User".

The user attribution is arbitrary information registered user by user.

The program memory unit 13 may be a semiconductor memory device which stores programs to be executed by the control unit 10. In this embodiment, the program memory unit 13 stores a program for realizing a system for dynamic contents such as CGI (Common Gateway Interface) and the like. Hereinafter, such the program for CGI will be referred to as "CGI program". According to the CGI program, the control unit 10 executes other application programs and/or accesses databases to dynamically generate web page data. Thus generated web page data may be written in, for example, HTML (Hyper Text Markup Language) which is suitable for data transfer via the Internet 3.

Figure 4:
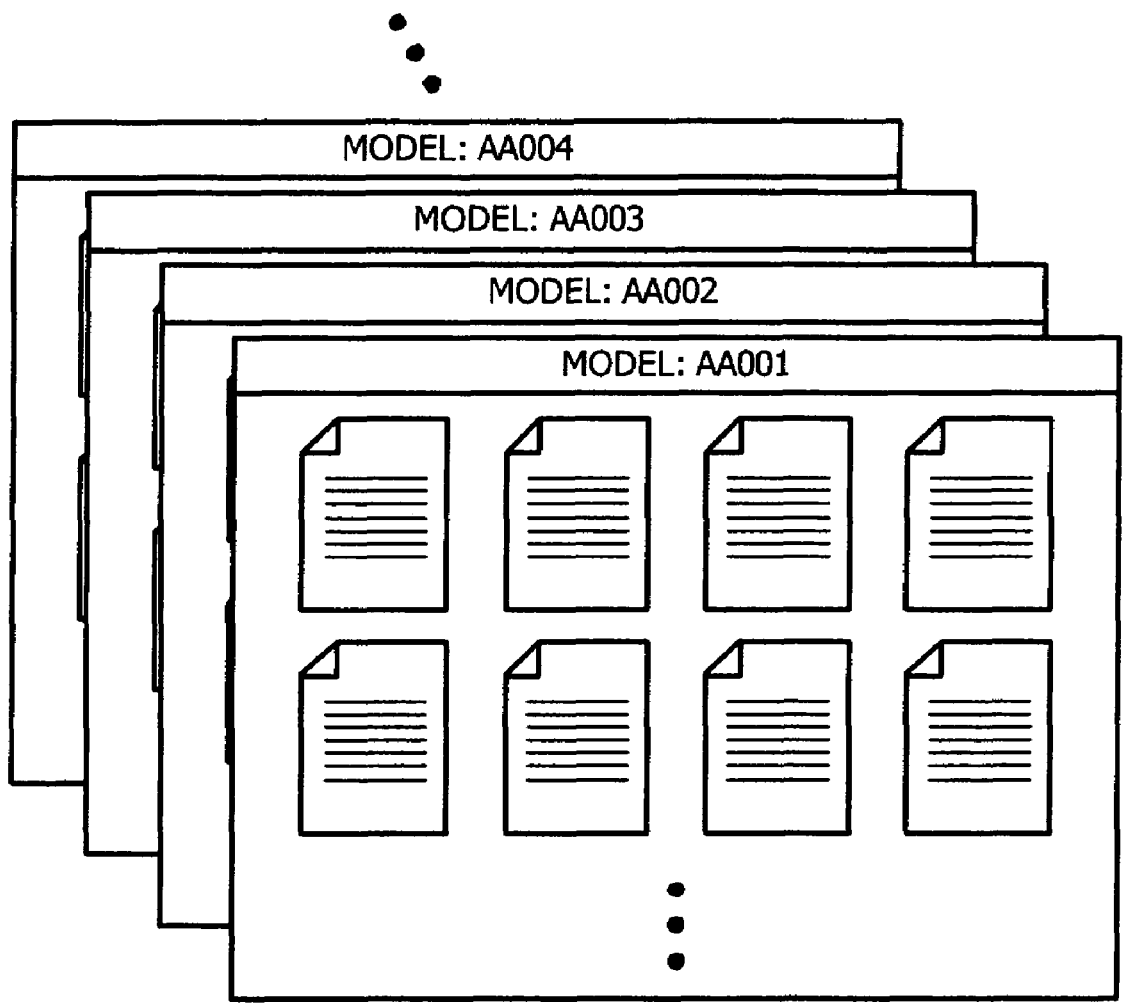
FIG. 4 is a diagram for explaining an example of files recorded in the manual database shown in FIG. 2.

The manual database 14 may be a rewritable storage unit such as a hard disk drive which stores electronic manual files written in, for example, HTML. The electronic manual files represent manuals for the products dealt by the manufacturer of the copier 300. FIG. 4 is a diagram for explaining an example of the electronic manual files being stored in the manual database 14. As shown in FIG. 4, records prepared for the models are stored in the manual database 14. That is, the electronic manual files in one record represents a series of manual for the corresponding model, and those files are categorized in accordance with the function of the model. Some of the electronic manual files will be selected in accordance with, for example, the user's request, thus manual pages will be created case by case.

The input unit 15 comprises, may be a keyboard, a mouse, and the like, to be used for inputting (editing) data to be stored (being stored) in the customer information database 12 and the manual database 14. For example, the input unit 15 is used for entering new customer information to the customer information database 12, or for adding or updating the electronic manual files in the manual database 14.

Figure 5:
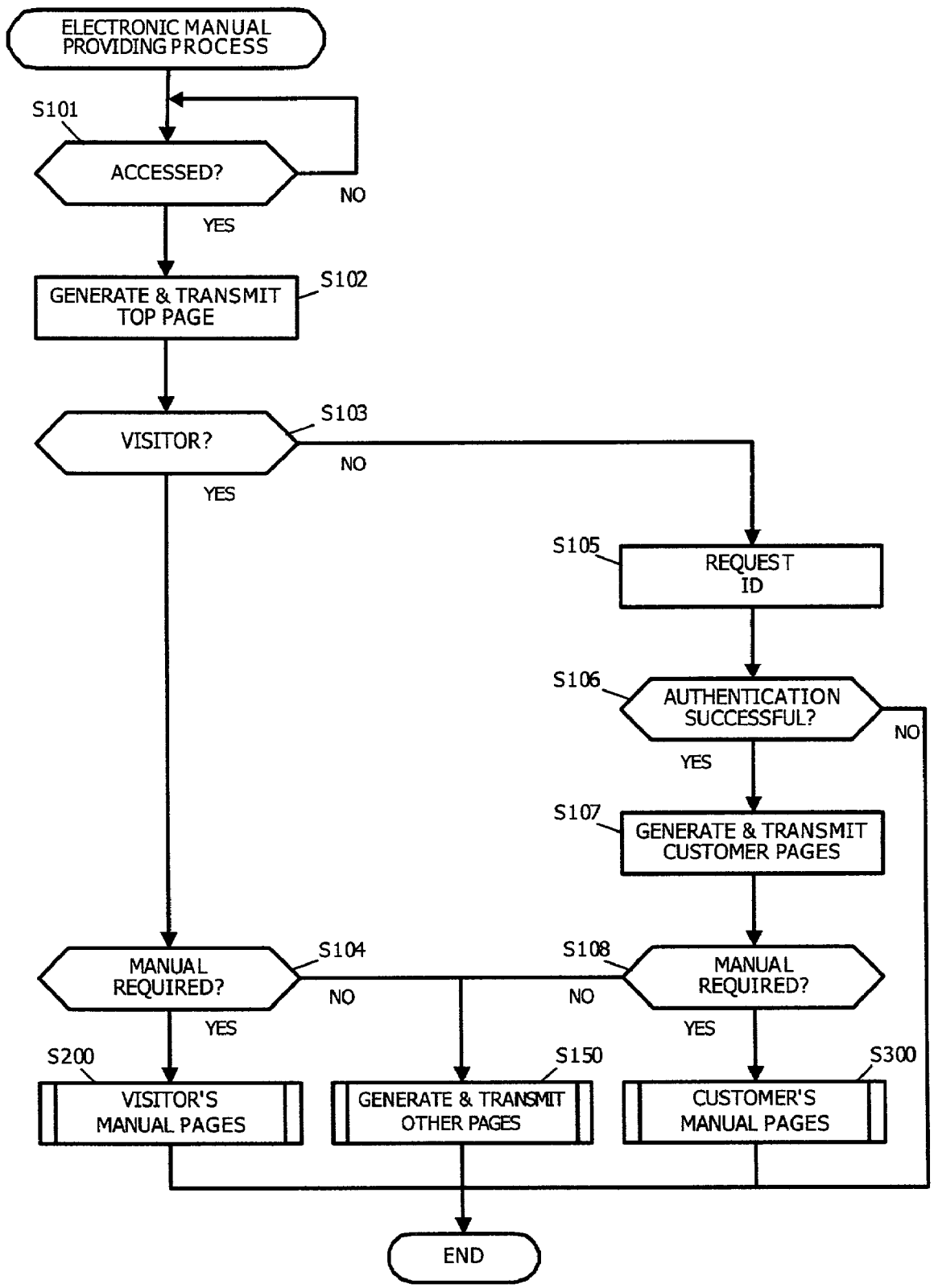
FIG. 5 is a flowchart for explaining an example of an operation for providing an electronic manual, carried out in the center shown in FIG. 1.

A process for providing electronic manuals according to the electronic manual providing system 1000 according to the present embodiment will now be explained below with reference to the flowchart shown in FIG. 5.

In this embodiment, a web site is established by the business manufacturing/vending the copier 300 to present various information (corporate information, product information, recruit information, and the like) through the Internet 3. The web site is built in the center 100. The web site includes pages for presenting electronic manuals (hereinafter referred to as "manual pages") available by using the terminal 500 through the Internet 3.

Figure 6:
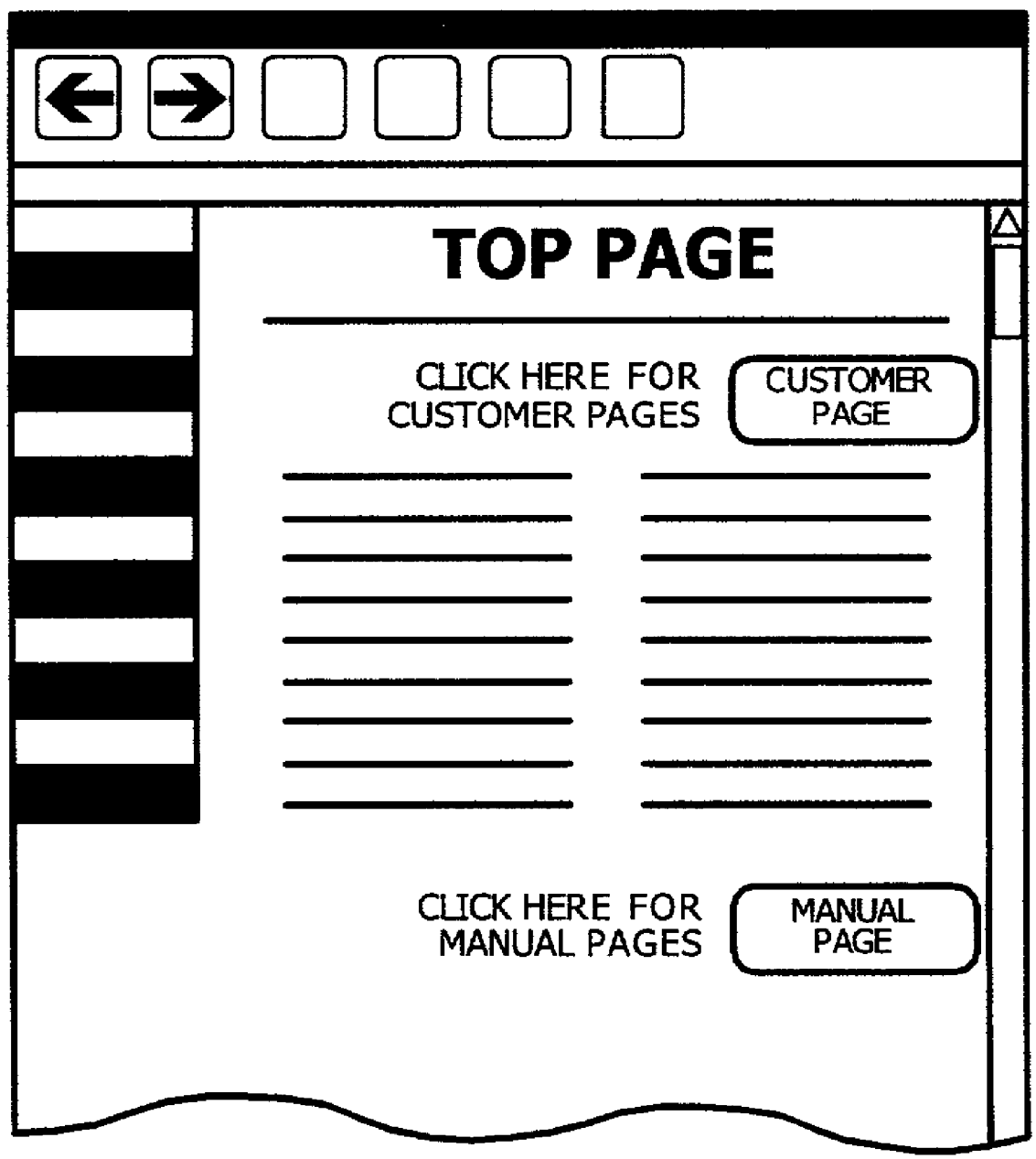
FIG. 6 is a diagram showing an example of a top page transmitted in the process flow shown in FIG. 5.

When a user operates the terminal 500 and accesses the web site (step S101: YES), the control unit 10 executes the CGI program and the like in the program memory unit 13 to generate web page data of a top page of the web site as shown in FIG. 6. The control unit 10 controls the CCU 11 to transmit the web page data to the terminal 500 (step S102). The control unit 10 also generates information for distinguishing the terminal 500 (such as cookie) and transmits it to the terminal 500 in order to identify the terminal 500 during the following sessions. Accordingly, "terminal 500" in the following explanations indicates the terminal 500 that accesses the center 100 at step S101.

As shown in FIG. 6, the top page includes some hyperlinks to the other pages in the web site. The web site includes unlimited pages being open to the public and limited pages which limits the users to registered customers (hereinafter, referred to as "customer page"). The registered customer means genuine users of the copier 300.

Since the customer page is limited to the registered customers, visitors other than the registered customers (hereinafter, the registered customer will be referred to as "customer", and the visitors other than the registered customers will be referred to as "visitor") may not select the hyperlink for the customer page. In this case (step S103: YES), the center 100 continuously provides the top page (unless any hyperlink is selected). The top page also includes the hyperlink to pages representing manuals (hereinafter referred to as "manual pages"). The visitors may select hyperlink to the manual pages if necessary.

If the hyperlink to the manual pages is selected (step S104: YES), an operation for providing the manual pages for visitors (hereinafter, referred to as "visitor's manual page") is executed in step S200. On the other hand, if the hyperlink to the manual pages is not selected (step S104: NO), that is, the hyperlinks are not selected or the hyperlink to other page is selected, the center 100 provides the top page continuously or pages corresponding to the selected hyperlink (step S150).

Figure 7:
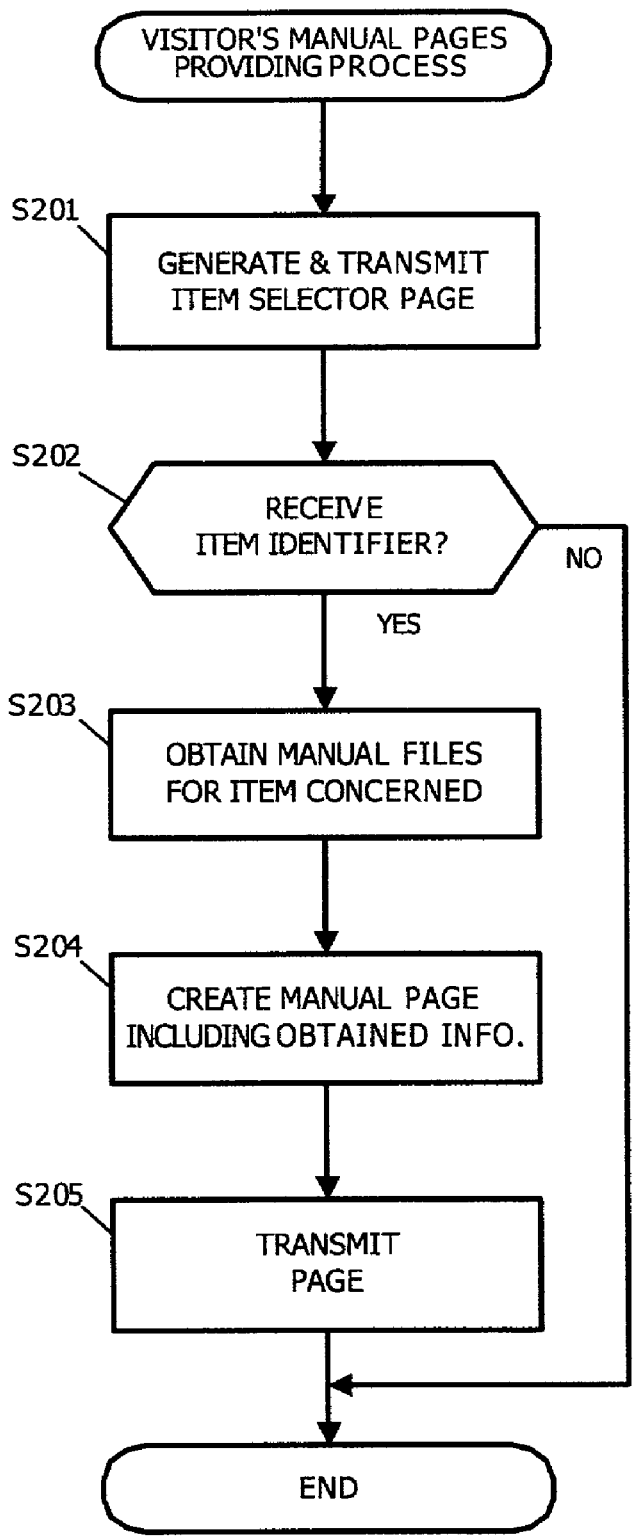
FIG. 7 is a flowchart for explaining an example of an operation for providing visitor's manual pages carried out in the process flow shown in FIG. 5.

The operation for providing the visitor's manual page (step S200) will now be explained below with reference to a flowchart shown in FIG. 7.

Figure 8:
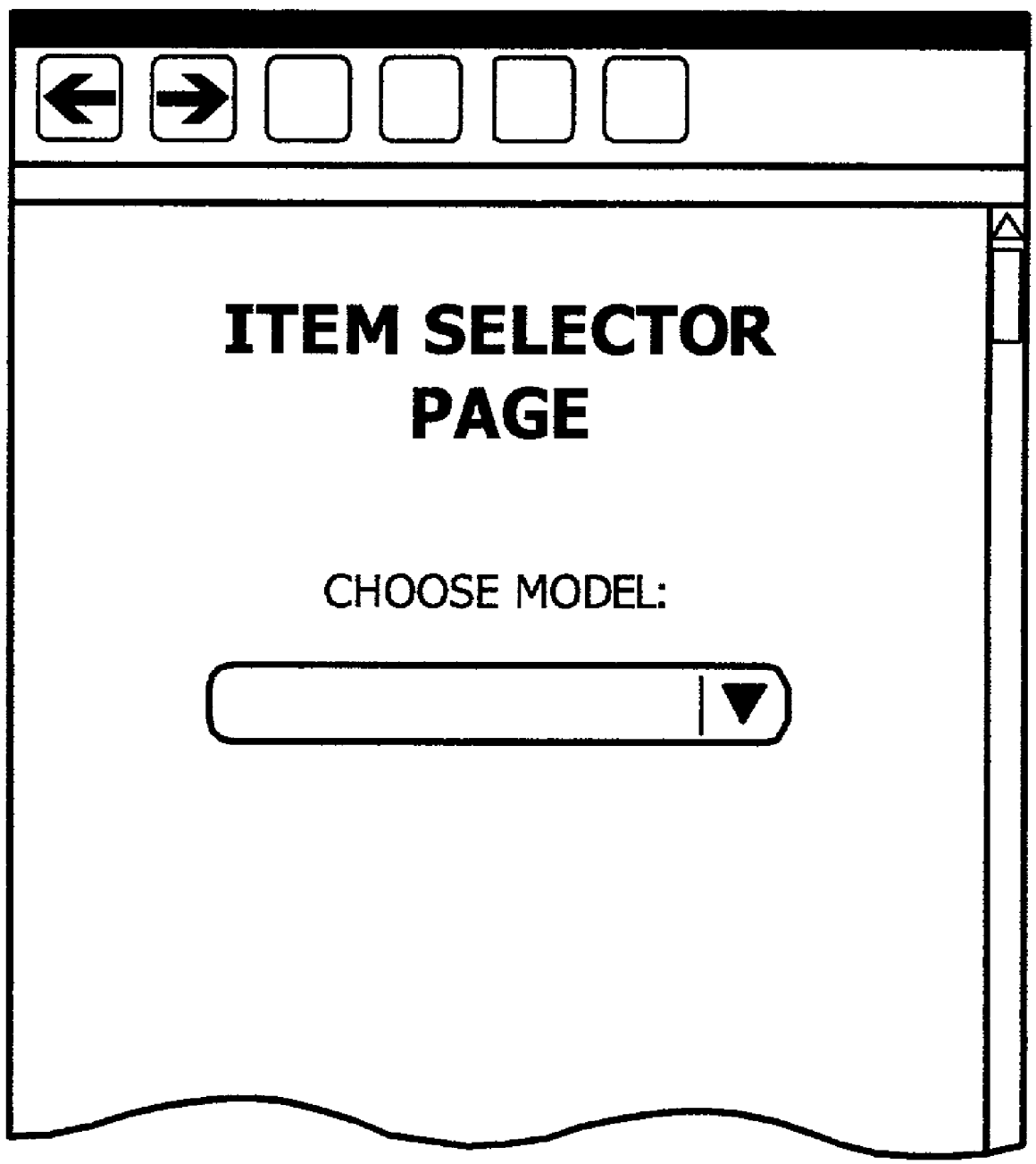
FIG. 8 is a diagram showing an example of an item selector page according to the embodiment of the present invention.

Upon selection of the hyperlink at step S104, the control unit 10 executes the CGI program and the like to generate web page data representing a page for selecting a product desired by the visitor (hereinafter, referred to as "item selector page") as shown in FIG. 8. And the control unit 10 controls the CCU 11 to transmit the generated web page data to the terminal 500 (step S201).

The item selector page has arbitrary selector(s) such as a combo box as shown in FIG. 8. In this case, the visitor select desired product from the list. More precisely, each product name in the list includes invisible information specifying the that product (hereinafter, referred to as "item identifier"). When the user selects desired item name, the corresponding item identifier is transmitted to the center 100.

Figure 9:
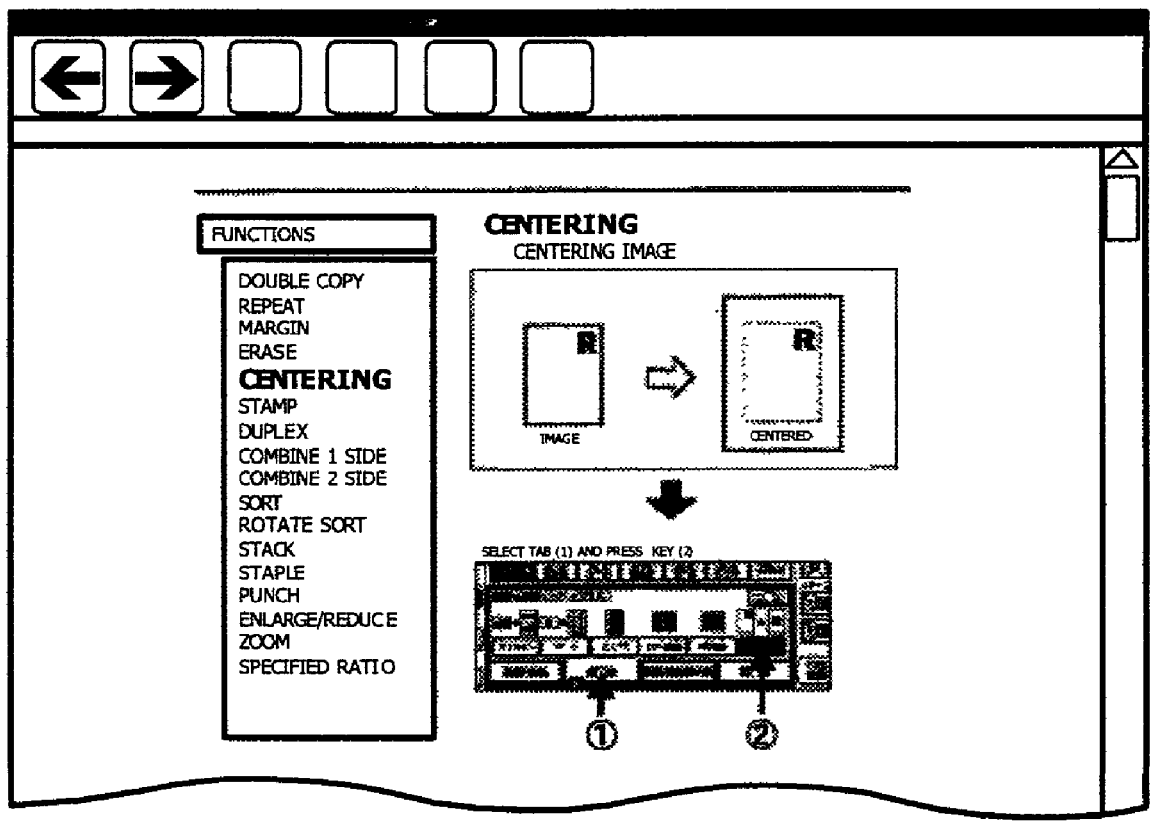
FIG. 9 is a diagram showing an example of an electronic manual page transmitted in the process flow shown in FIG. 7.

When the CCU 11 of the center 100 receives the item identifier from the terminal 500 via the Internet 3 (step S202: YES), the control unit 10 retrieves electronic manual files from the manual database 14. In this case, the control unit 10 obtains the manual file from the record corresponding to the product specified by the received item identifier. Then, the control unit 10 executes the CGI program and the like to generate web page data representing manual page as shown in FIG. 9 (step S204). In this case, the control unit 10 generates the web page data, so that the page includes information represented by the retrieved manual file. The control unit 10 controls the CCU 11 to transmit the generated web page data to the terminal 500 via the Internet 3 (step S205), and terminates the operation.

Another operation for a case where the customer accesses the web site will now be explained.

When the customer operates the terminal 500 and selects the hyperlink to the customer page, the terminal 500 transmits a request signal for requesting the customer page to the center 100.

Figure 10:
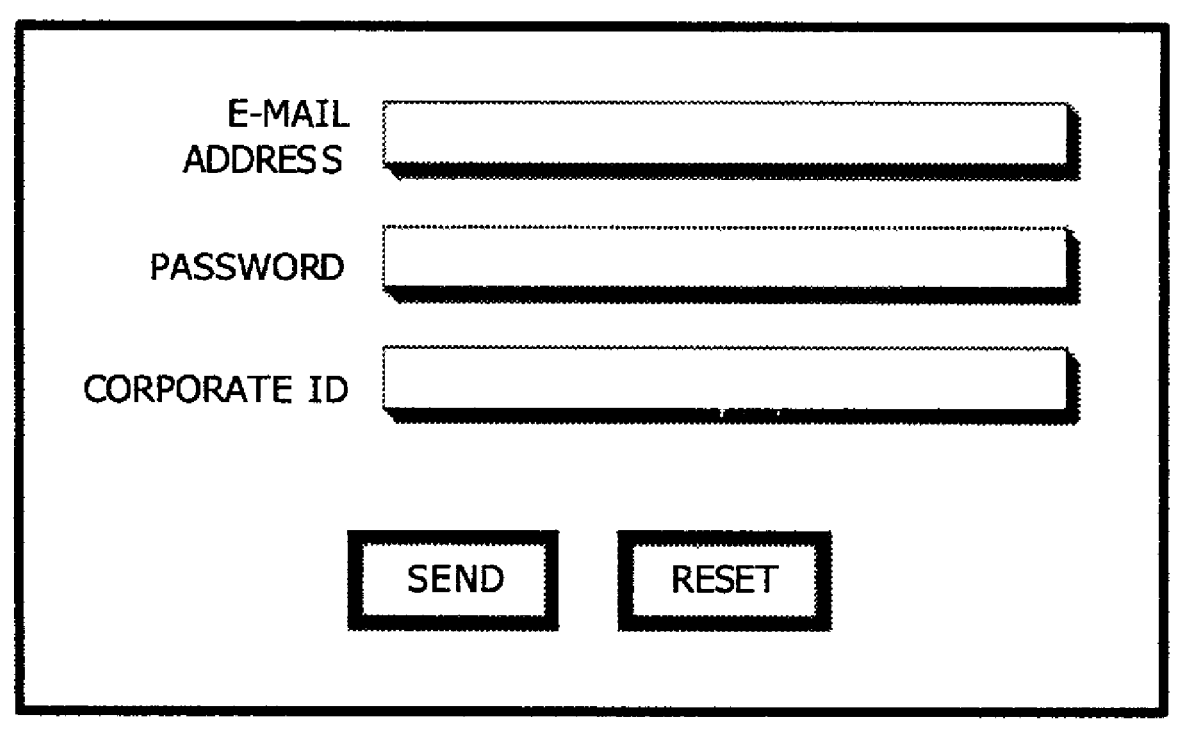

When the CCU 11 of the center 100 receives the request signal from the terminal 500 (step S103: NO (FIG. 5)), the control unit 10 executes the CGI program and the like in the program memory unit 13 to generate web page data representing a form page for inputting user ID as shown in FIG. 10. Then the control unit 10 controls the CCU 11 to transmit the generated web page data to the terminal 500, thus requesting the customer to input his/her user ID (step S105).

As shown in FIG. 10, the form page includes text boxes for inputting the customer's mail address, password, and corporate ID (that is, user ID), and buttons for sending or canceling the input information.

When the customer inputs his/her user ID and select the "send" button, the terminal 500 transmits the input user ID to the center 100 via the Internet 3.

When the CCU 11 of the center 100 receives the user ID from the terminal 500, the control unit 10 determines whether the user is the registered customer or not (step S106). In this case, the control unit 10 accesses the customer information database 12 to determine whether user ID which coincides with the received ID has been registered in the customer information database 12 or not.

In a case where the customer information database 12 does not have the user ID coinciding with the received user ID, or any one of the items in the received user ID is incorrect, the control unit 10 determines that the user concerned is not the registered customer (step S106: NO), and terminates the process.

Figure 11:
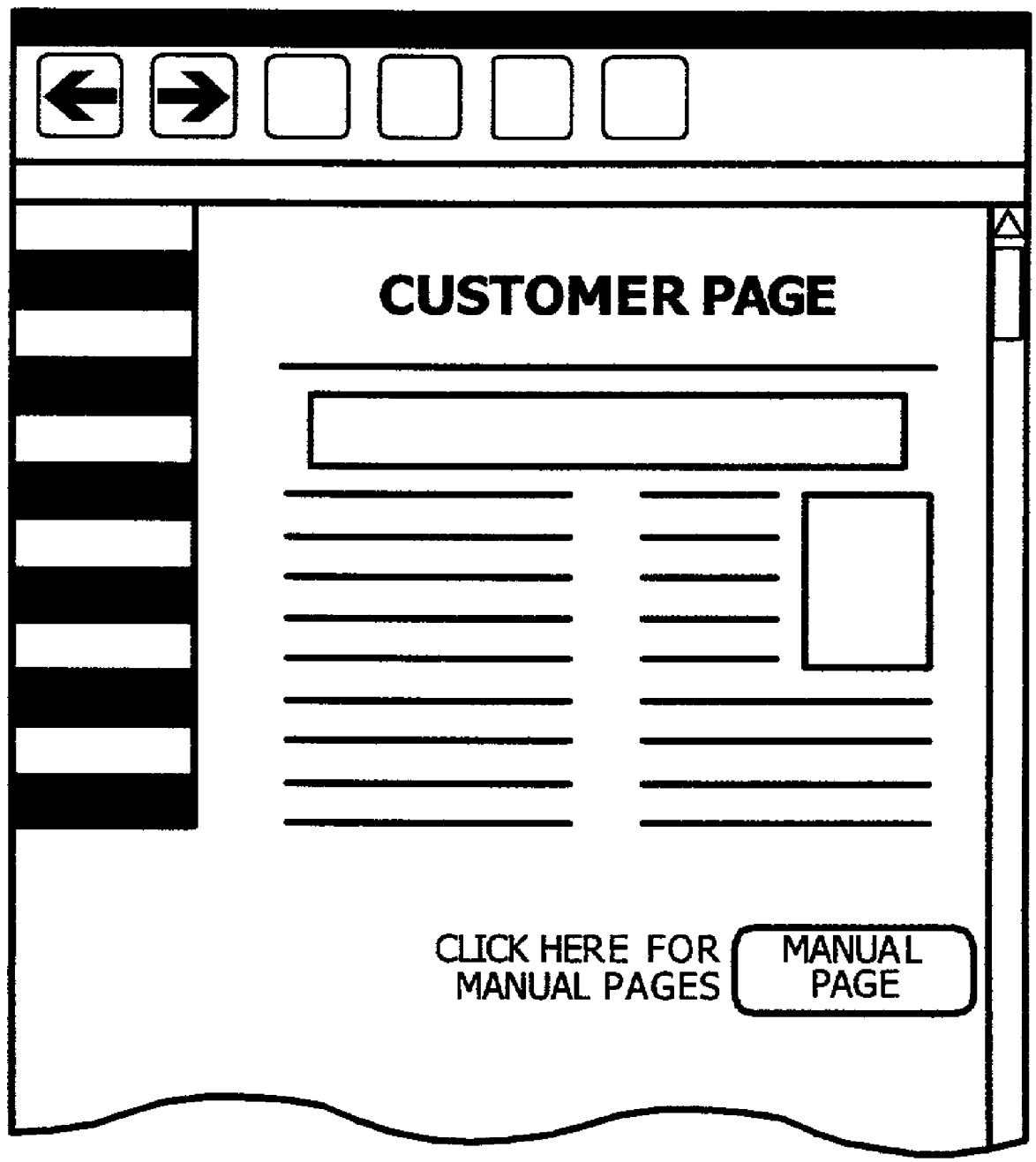
FIG. 11 is a diagram showing an example of a customer page transmitted in the process flow shown in FIG. 5.

In contrast, in a case where the user authentication is successful, that is, the control unit 10 determines that the user concerned is the registered customer (step S106: YES), the control unit 10 executes the CGI program and the like to generate web page data representing a customer page as shown in FIG. 11. The control unit 10 controls the CCU 11 to transmit the web page data to the terminal 500 (step S107). Note that the customer page includes specialized information for the registered customers, such as support information and upgrade information.

As shown in FIG. 11, the customer page also includes a hyperlink to manual pages specialized for the customers (hereinafter, referred to as "customer's manual page"). URL (Uniform Resource Locator) indicating the manual page for the customers is invisibly assigned to the hyperlink. That is, if the user selects the hyperlink with operating the terminal 500, the terminal 500 transmits the URL to the center 100.

When the CCU 11 of the center 100 receives the URL indicating the customer's manual page from the terminal 500 (step S108: YES), an operation for providing the customer's manual pages is carried out at step S300.

On the other hand, in a case where the hyperlink to the customer's manual page is not selected by the terminal 500, that is, no hyperlink is selected or the hyperlink to another page is selected, the control unit 10 transmits the customer page continuously or other designated page (step S150).

The operation for providing the customer's manual page (step S300) will now be explained with reference to a flowchart shown in FIG. 12.

The control unit 10 accesses the customer information database 12 to refer to "Current Model" in the customer information corresponding to the user ID received at step S106 (step S301).

Figure 13:
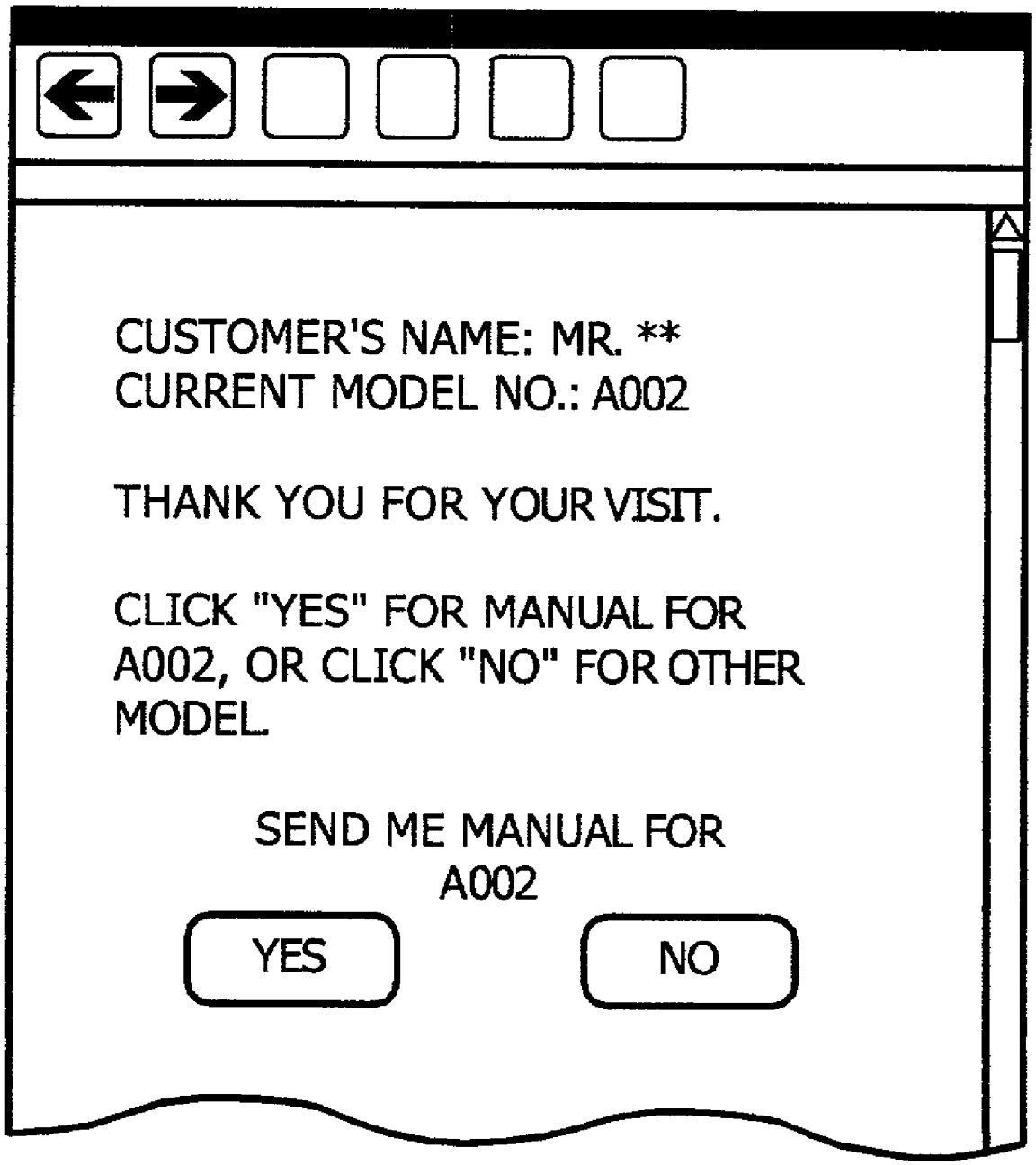
FIG. 13 is a diagram showing an example of a top page transmitted in the process flow shown in FIG. 12

Then, the control unit 10 executes the CGI program and the like to generate web page data representing a top page of the customer's manual pages as shown in FIG. 13. The control unit 10 controls the CCU 11 to transmit the generated web page data to the terminal 500 (step S302).

As shown in FIG. 13, the top page indicates model No. (or model name) based on "Current Model" referred at step 301 The top page also includes "YES" and "NO" buttons for selecting manuals for the indicated model ("YES") or manuals for other model ("NO").

In case of requesting the manuals for the current model, the user operates the terminal 500 to select "YES" button, and the terminal 500 transmits a request signal for requesting manual pages of the current model to the center 100 via the Internet 3. When the CCU 11 in the center 100 receives the request signal from the terminal 500, the control unit 10 accesses the manual database 14 to retrieve the electronic manual files for the product corresponding to "Current Model" referred at step S301 (step S304).

Figure 14:
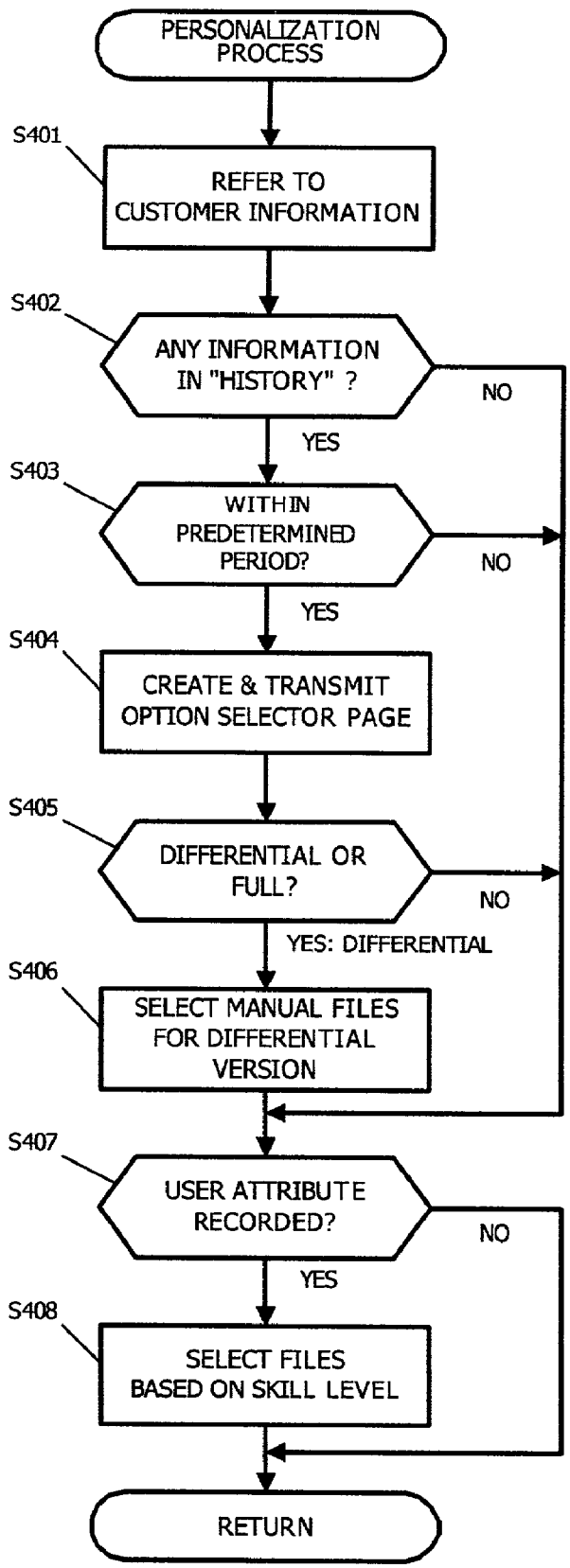
FIG. 14 is a flowchart for explaining an example of a personalizing operation carried out in the process flow shown in FIG. 12.

Upon retrieval of the electronic manual files, the control unit 10 carries out a personalizing operation (step S400). This personalizing operation will now be explained below with reference to a flowchart shown in FIG. 14.

The control unit 10 accesses the customer information database 12 to refer to the customer information (see FIG. 3) of the customer (step S401).

Figure 15:
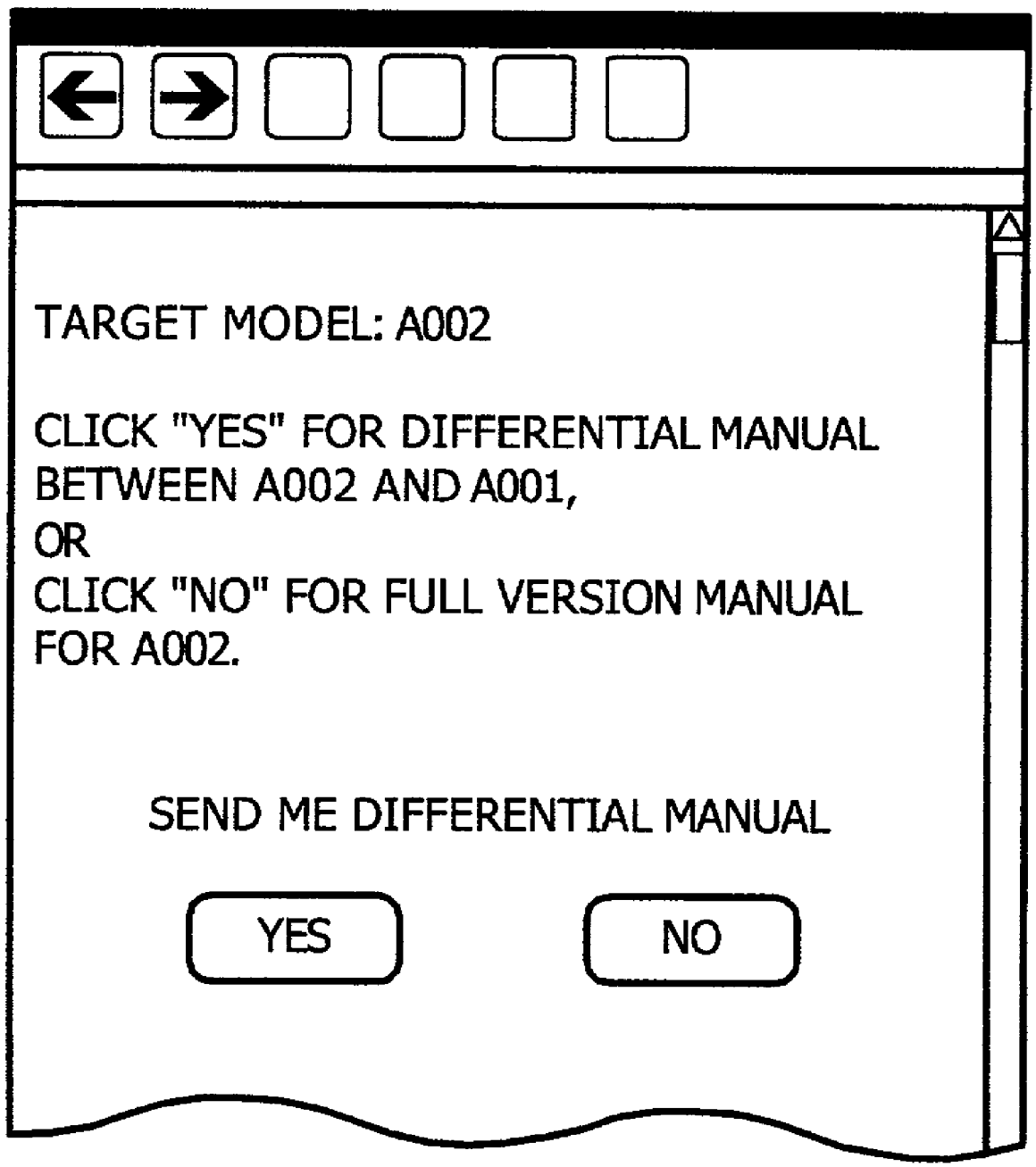
FIG. 15 is a diagram showing an example of an option selector page transmitted in the process flow shown in FIG. 14.

If the control unit 10 finds any information in "History" of the customer information (step S402: YES), the control unit 10 obtains information representing the date of upgrade. And, the control unit 10 determines whether the number of days after the date of upgrade is within a predetermined period (for example, 1 month) or not (step S403). If it is determined that the number of days is within the predetermined period (step S403: YES), the control unit 10 executes the CGI program and the like to generate web page data representing an option selector page as shown in FIG. 15. The control unit 10 controls the CCU 11 to transmit the generated web page data to the terminal 500 (step S404).

As shown in FIG. 15, the option selector page presents option between a full version of the manual for the current model (hereinafter, referred to as "full manual") and an extract version comprising the electronic manual files describing functions of the current model which are different from the former model (hereinafter, referred to as "differential manual"). And the option selector includes "YES" and "NO" buttons for selecting the option. According to the message on the option selector page, the user may select "YES" button if he/she requires the full manual, or may select "NO" button if he/she requires the differential manual.

According to steps S402 and S403, option for the differential manual is prepared if it has been within a predetermined period since the user upgraded the copier 300. This is because it is supposed that the user may be unfamiliar with functions of the new model around the initial stage immediately after the upgrade (in this embodiment, for 1 month), while he/she may be familiar with the functions which are the same as those of the former model.

If the user operates the terminal 500 to select the differential manual (step S405: YES), the terminal 500 transmits a request signal for requesting the differential manual (hereinafter, referred to as "request for differential").

When the CCU 11 of the center 100 receives the request for differential from the terminal 500 (step S405: YES), the control unit 10 selects the electronic manual files describing the functions of the current model which are different from those of the former model, from the electronic files retrieved in step S304 (FIG. 12) (step S406).

Figure 16:
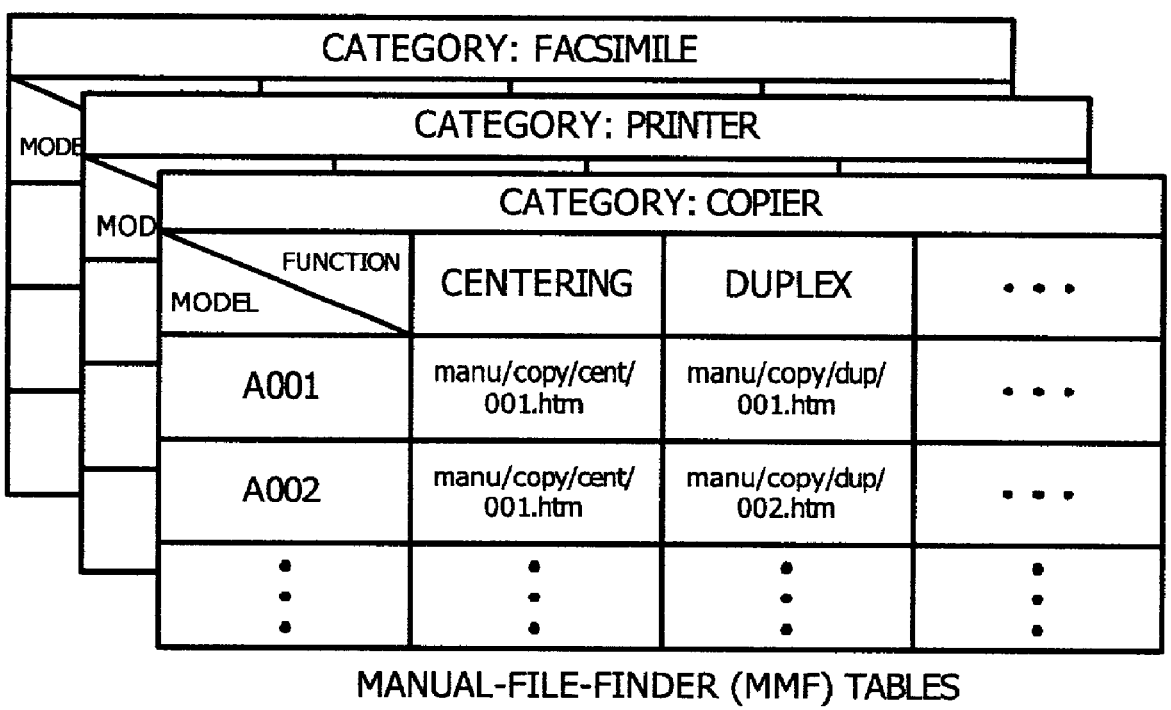
FIG. 16 is a diagram showing an example of MMF tables to be referred to in the process flow shown in FIG. 14.

This manual file selection will now be described in detail. The manual database 14 stores "Manual-File-Finder" tables (hereinafter, referred to as "MFF tables") as shown in FIG. 16. The MFF tables are prepared category by category, such as copier, printer, and facsimile.

As shown in FIG. 16, each table defines file name of the electronic manual file based on model name and functions.

An example of file determination where the current model (determined at step S301) is Model A002 and the former model (determined at step S402) is Model A001 will now be described.

The control unit 10 accesses the manual database 14 to refer to the MFF table for the copier. And, the control unit 10 compares items for Model A001 with those for Model A002.

In FIG. 16, as for the function "Centering", both A001 and A002 designate the electronic manual file "manu/copy/cent/001.htm". This means that there is no operational and/or functional difference between A001 and A002.

On the contrary, as for the function "Duplex Copy", A001 designates the electronic manual file "manu/copy/dup/001.htm", while A002 designates "manu/copy/dup/002.htm". This means that there are operational and/or functional differences between A001 and A002.

As comparing file names between target models, the control unit 10 picks up the file names designated by any one of the target models, and obtains the electronic file in accordance with the picked up file name as files for the differential manual.

After thus selecting the files for the differential manual at step S406, or if the control unit 10 determined that there is no information in "History" (step S402: NO), or if the control unit 10 determined that the predetermined period has passed (step S403: NO), the control unit 10 further determines whether there is any information in "User Attribute" of the customer information concerned.

If the "User Attribute" includes any information (step S407: YES), the control unit 10 selects the manual files corresponding to the user attribute information from the manual files obtained at step S304 or S406 (step S408).

The relationship between the user attribute and electronic manual files, for selecting the electronic manual files will now be described in detail. The electronic manual files are categorized, for example, by skill levels. The categories may be, for example, "Beginner", "Basic", "Middle", and "Advanced", and those categories are associated with the user attribute, "Ordinary User", "Key Operator", "Administrator", and "Purchaser". For example, in case of "Ordinary User", the electronic manual files corresponding to "Beginner" and "Basic" may be selected. In the same manner, "Administrator" relates to "Basic" and "Middle", "Purchaser" relates to "Beginner" and "Basic", and "Key Operator" relates to "Middle" and "Advanced".

If it is determined that the user attribute is not registered (step S407: NO), the control unit 10 determines the electronic manual files selected at step S304 or S406 to be presented.

Figure 12:
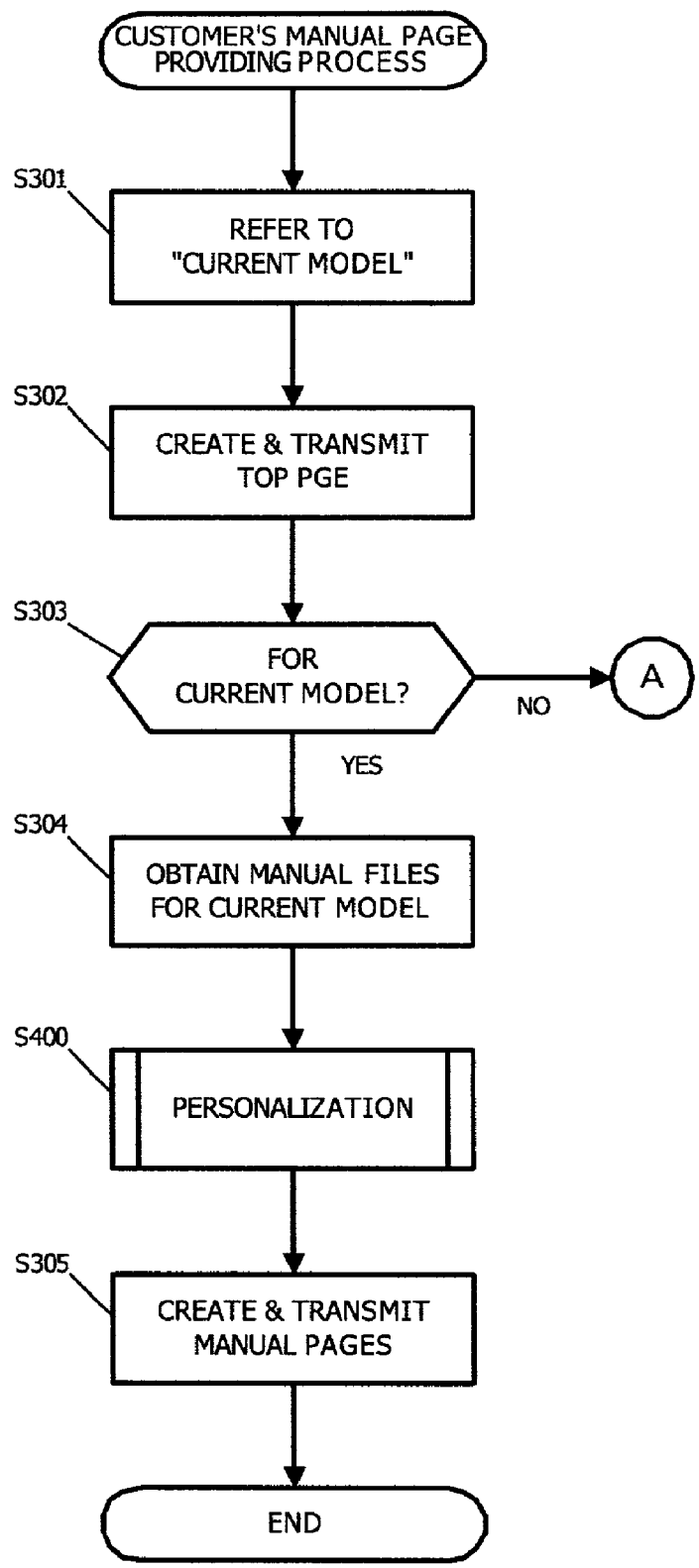
FIG. 12 is a flowchart for explaining an example of an operation for providing a customer's manual page carried in the process flow shown in FIG. 5.

The process flow forwards to step S305 (FIG. 12). In step S305, the control unit 10 executes the CGI program and the like to generate web page data representing an electronic manual page indicative of the selected electronic manual files. The control unit 10 controls the CCU 11 to transmit the generated web page data to the terminal 500.

Figure 17:
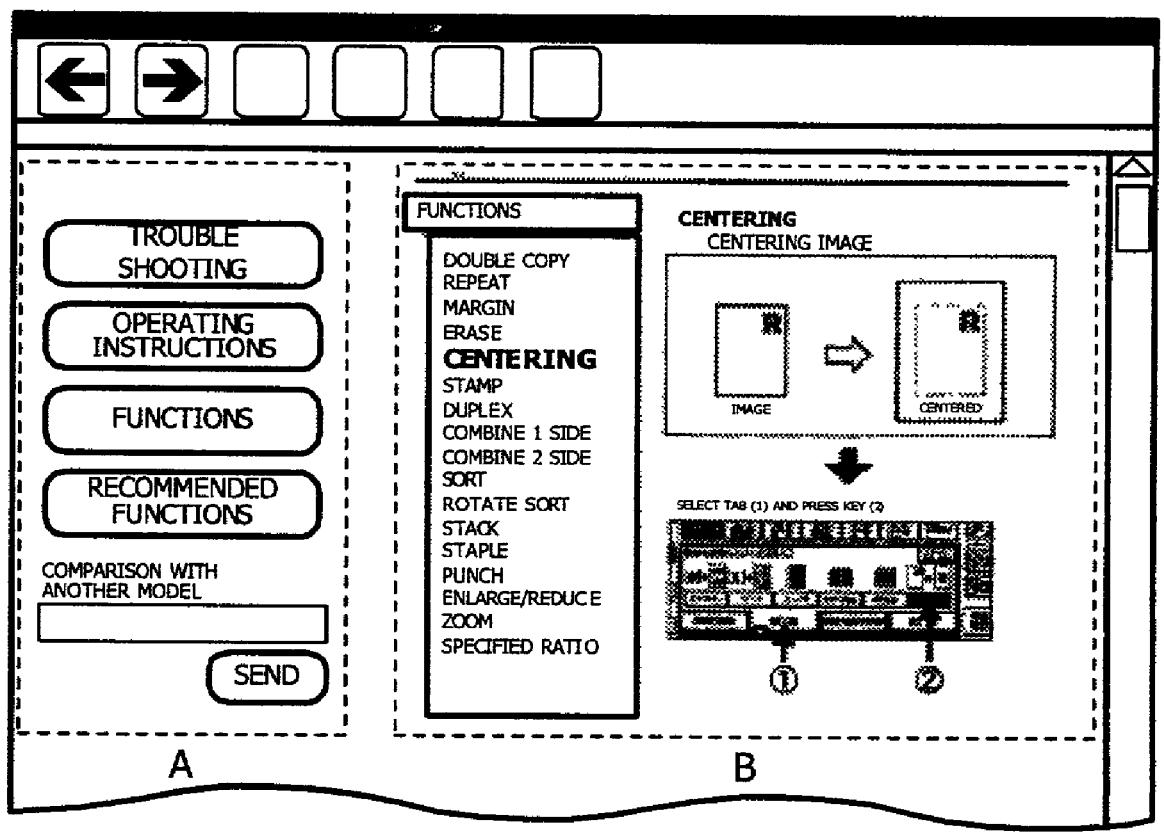
FIG. 17 is a diagram showing an example of an electronic manual page transmitted in the process flow shown in FIG. 12.
Figure 18A:
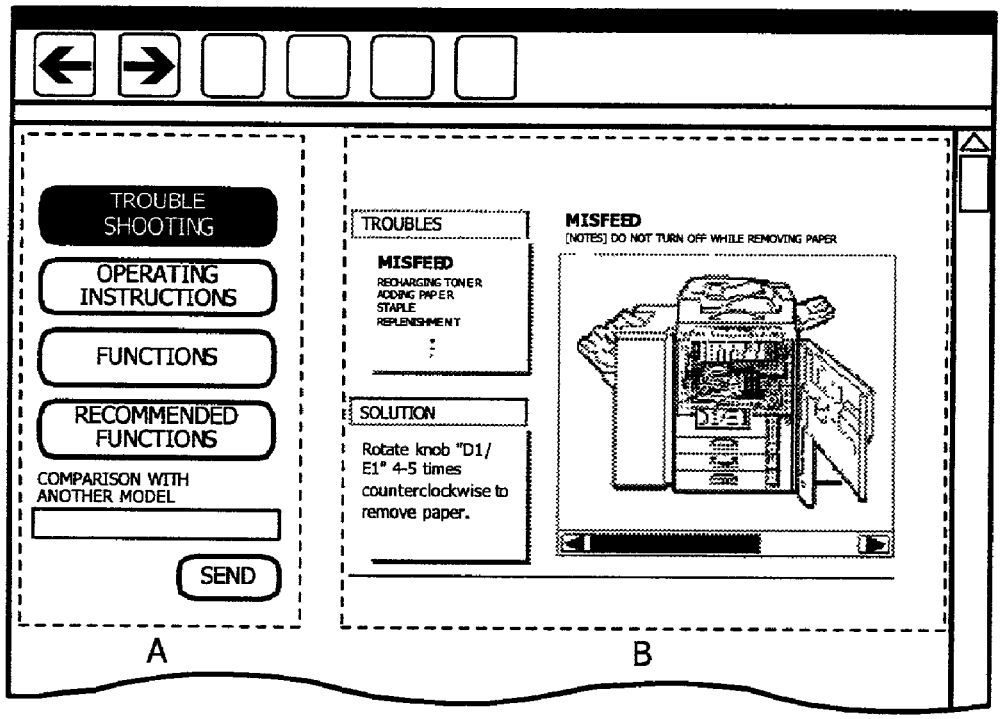
FIGS. 18A and 18B are diagrams showing other examples of the electronic manual pages transmitted in the process flow shown in FIG. 12.
Figure 18B:
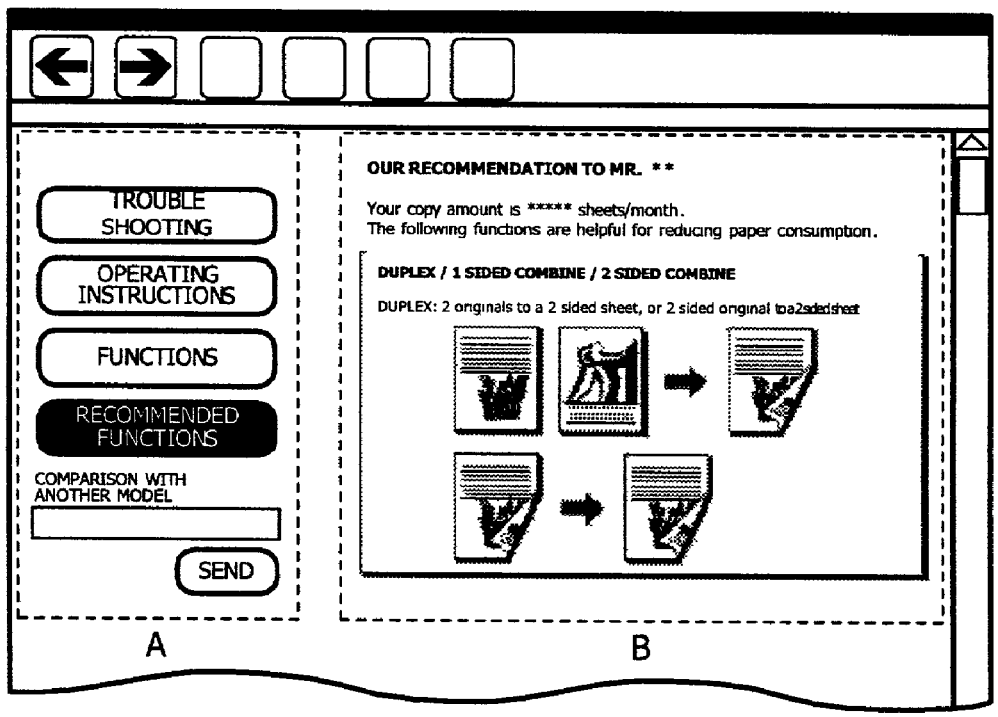

FIGS. 17, 18A, and 18B are diagrams showing an example of examples of electronic manual pages generated at step S305.

As shown in FIG. 17, the electronic manual page has two sections, section A and section B (indicated by broken lines). The section A includes ordinary objects such as menu buttons for selecting items of the manual. Those menu buttons are prepared for manual search. The section B includes contents of the electronic manual files selected at step S406 or S408. It is featured that the section B may occupies the page, that is, the electronic manual page shows the contents of the selected electronic files so as to focus the user on it.

The menu buttons in the section A may represent, for example, "Trouble Shooting", "How to Use", "Functions", "Recommended Functions", and the like. When the user selects the menu button "Trouble Shooting", trouble shooting information corresponding to the user's "Current Model" will be displayed in the section B as shown in FIG. 18A.

The trouble shooting information may be in hierarchical structure, that is, trouble index information representing kinds of troubles links to text and/or image files representing solutions. In response to the selection of the trouble index (by clicking or the like), the solution information is presented step by step. The solution steps may be represented by, for example, comprehensive movie or animation.

In a case where the menu button "Recommended Functions" is selected, information representing tips or the like recommended by the manufacturer/vendor of the copier 300 will be displayed in the section B.

A case where the user desires the electronic manual for a model other than the user's current model will now be described. When "NO" button on the top page of the user's manual pages is selected, the terminal 500 transmits a request signal for requesting manual for other model to the center 100.

Figure 19:
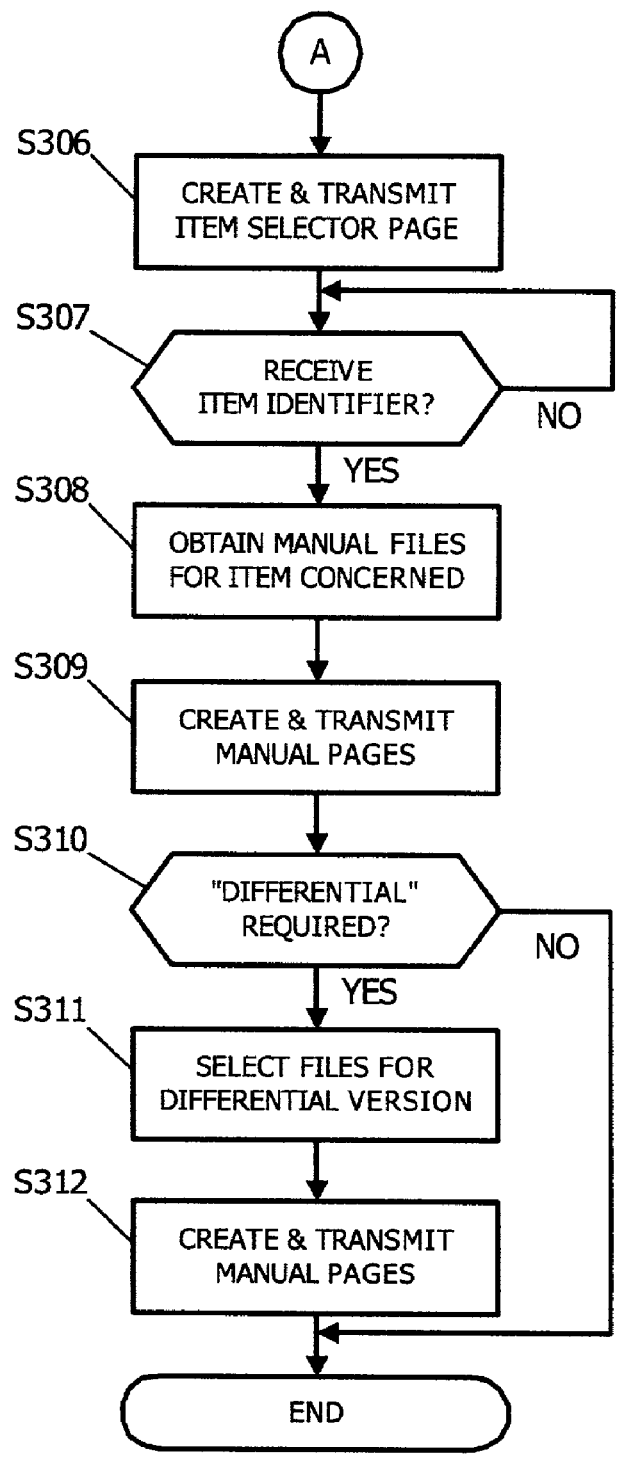
FIG. 19 is a flowchart for explaining an example of the operation for providing the customer's manual page carried out in the process flow shown in FIG. 5.

When the CCU 11 of the center 10 receives the request signal from the terminal 500 (step S303: NO), the control unit 10 executes the CGI program and the like in the program memory unit 13 to generate web page data representing the item selector page as shown in FIG. 8. The control unit 10 controls the CCU 11 to transmit the data to the terminal 500 (step S306 (FIG. 19)).

As aforementioned, the item selector page has selector(s) such as a combo box or the like for selecting a product (model). In response to the selection of the product, the terminal 500 transmits information specifying the selected product (product specifying information) to the center 100 via the Internet 3.

When the CCU 11 of the center 100 receives the product specifying information from the terminal 500 (step S307: YES), the control unit 10 accesses the manual database 14 to retrieve electronic manual files corresponding to the product (hereinafter referred to as a "target product") specified by the received product specifying information (step S308).

Figure 20:
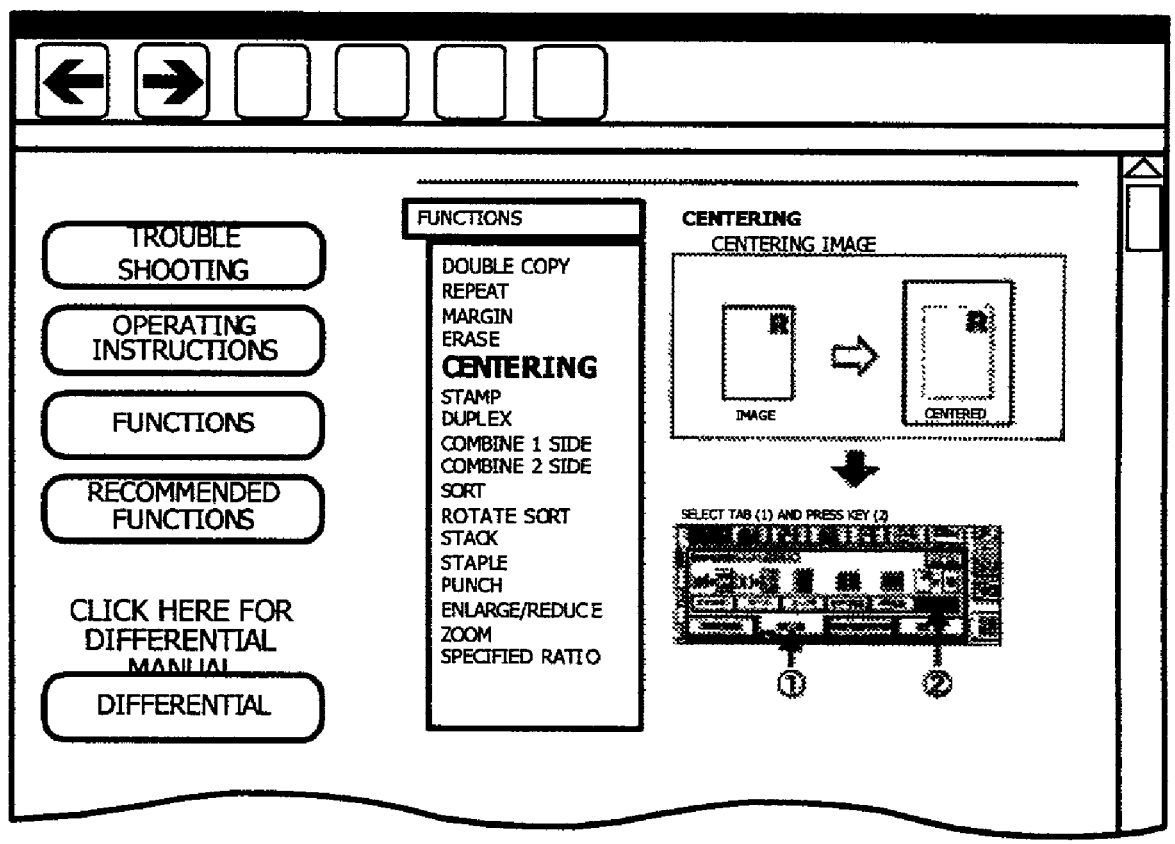
FIG. 20 is a diagram showing an example of an electronic manual page transmitted in the process flow shown in FIG. 19.

The control unit 10 executes the CGI program and the like in the program memory unit 13 to generate web page data representing an electronic manual page as shown in FIG. 20 which shows the contents of the electronic manual files retrieved in step S308. The control unit 10 controls the CCU 11 to transmit the web page data to the terminal 500 (step S309).

As shown in FIG. 20, the electronic manual page also includes a button linking to pages for presenting differential manuals between the target model and the user's current model. The button (hyperlink) invisibly includes URL information specifying the pages of the differential manual. In response to selecting the button, the terminal 500 transmits the URL information is sent to the center 100.

When the CCU 11 of the center 100 receives the URL information from the terminal 500 (step S310: YES), the control unit 10 selects the electronic manual files representing the functions of the target model being different from those of the user's current model (step S311).

The control unit 10 executes the CGI program and the like in the program memory unit 13 to generate web page data representing an electronic manual page showing an example of the contents of the electronic manual files selected in step S311 The control unit 10 controls the CCU 11 to transmit the web page data to the terminal 500 (step S312), and terminates the operation.

According to the above operation, the center 100 provides the user with the differential manuals between the current model and another model which is a target for comparison. Therefore, the user can effectively study about nominees for upgrading.

According to this embodiment as described above, when the registered customer requests the electronic manual to the center 100, the center 100 automatically selects the electronic manual files and provides him/her with them without asking the user to input any information for specifying the model. Thus, the customer can quickly obtain a desired electronic manual.

Further, if the user wants to study products (models) other than one he/she currently uses before buying, the user can requests the center 100 to provide him/her with differential manual describing functional differences between the target model and the current model with just designating the target model (model name, model No., or the like). Accordingly, the user can study about target models efficiently. Since information regarding to the differences is transferred, it reduces connection time for browsing the manuals.

In a case where a customer upgraded the copier 300 and it has been within a predetermined period (for example, 1 month), the center 100 provides the customer with option for the differential manual between the current model and the former model.

According to this structure, the user can learn about significant features of the upgraded model quickly. Since only necessary and sufficient information is transferred, it reduces connection time for browsing the manuals.

Since even anyone other than the registered customers can browse the electronic manuals for a desired model, a person who plans to buy a product can study about target models in view of usability before buying.

In the above embodiment, the electronic manual pages are prepared on the web site of the manufacturer/vendor of the copier 300. However, the electronic manual providing page may exist solely on the Internet 3. In this case, the customer identification may be done at the time a customer accesses the electronic manual providing site.

The center 100 of the above embodiment may be realized not only by a dedicated system, but also by a general computer system. For example, it is able to establish an information providing site which executes the above describe operations by installing a program for executing the above-described operations into a general-purpose computer from a medium which stores the program (such as a flexible disk, CD-ROM, or the like).

In this case, it may employ arbitrary means for providing the program to the computer. For example, the program may be distributed through communications networks, a communications system, or the like. In this case, the program may be uploaded on a bulletin board system (BBS) on a communications network, and the program may be superimposed on a carrier wave signal, so as to be distributed through the network. And, the above described operations can be done by running thus distributed program in the same manner for the other application programs under the control of the OS (Operating System).

According to the present invention, an electronic manual for a product being used by a customer is automatically selected and provided, and an electronic manual describing functional differences between target products is provided to users.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2000-338927 filed on Nov. 7, 2000 and including specification, claims, drawings and summary. The disclosure of the above Japanese Patent Application is incorporated herein by reference in its entirety.

What is claimed is:

1. A system for providing an electronic manual, the system comprising a server and a plurality of terminals interconnected via a communication network, the server comprising:
  a storage unit configured to store a plurality of electronic manual information sets, each of the sets describing the content of a product manual,
  a receiver configured to receive, via the communication network, request information from a terminal requesting an electronic manual,
  a memory configured to store customer information and associated product information, the customer information representing registered customers and the product information representing products used by the registered customers,
  an identifier configured to determine, based on customer information stored in the memory, whether request information received by the receiver was sent by a registered customer,
  a selector configured to select, from the storage unit, the electronic manual information set of a product represented by product information stored in association with the customer information when the identifier determines that request information received by the receiver was sent by a registered customer wherein the manual information set is automatically selected based on a user attribute comprising a skill level, and
  a provider configured to provide to the terminal requesting an electronic manual, via the communication network, the electronic manual information set selected by the selector,
  wherein, based on the request, the selector determines whether the customer desires to see a difference between a product previously used by the customer and another product currently used by the customer, and
  the provider provides the electronic manual representing the difference if it is determined that the customer desires to see the difference, showing the electronic manual of the product based on the request prior to the manual of the other product or so that the electronic manual of the product is visually distinguishable from the manual of the other product.

2. The system of claim 1, wherein the provider provides the electronic manual information set selected by the selector to the terminal so that the information representing the electronic manual is visually distinguishable from the other information.

3. The system of claim 1, wherein the customer information comprises purchase history information, and the selector uses the history information to select an information set.

4. The system of claim 1, wherein the identifier receives information representing a product desired by the customer, and the selector selects an information set based upon differences between the product desired by the customer and the product used by the customer.

5. The system of claim 1, wherein the customer information comprises attribute information representing attribute of the customer with respect to products used by the customer, and the selector uses the attribute information to select an information set for a specified product.

6. The system of claim 1, wherein the communication network comprises the Internet.

7. A system for providing an electronic manual, comprising:
  storage means for storing a plurality of files, each of the files representing the content of a product manual,
  reception means for receiving a request for at least one of the files stored in the storage means,
  identification means for identifying a requester initiating the request received by the reception means,
  selector means for automatically selecting a file based on a user attribute comprising a skill level,
  determination means for determining whether the requestor desires to see a difference between a product previously used by a customer based on the request and another product currently used by the customer,
  retrieval means for retrieving, from the storage means, at least one file for a product used by the requester identified by the identification means with retrieving other file representing the manual of the other product if it is determined that the requester desires to see the difference, and
  sending means for sending to the requester the file retrieved by the retrieval means so that the electronic manual of the product based on the request is provided prior to the other product manual or so that the electronic manual of the product is visually distinguishable from the manual of the other product.

8. A method for providing an electronic manual, comprising:
  storing a plurality of information sets, each of the sets representing the content of a product manual,
  maintaining customer information and associated product information, the customer information representing a registered customer and the product information representing a product used by the registered customer,
  receiving, via a communication network, a request for an electronic manual associated with a product,
  determining whether the request originates from a registered customer,
  selecting an information set representing the content of the manual for the product being associated with the customer information when the request originates from a registered customer wherein the information set is automatically selected based on a user attribute comprising a skill level, and
  determining whether the customer desires to see a difference between a product previously used by the customer and another product currently used by the customer,
  providing, via a communication network, the selected information set to a terminal which is accessible by the registered customer,
  wherein the step of providing the selected information set to a terminal includes providing the electronic manual information to the terminal so that the information representing the electronic manual is visually distinguishable from the other information.

9. The method of claim 8, wherein the step of providing the selected information set to a terminal includes providing the electronic manual information to the terminal so that the information representing the electronic manual is visually distinguishable from other manual of product other than the product in the requested electronic manual.

10. The method of claim 8, wherein the step of determining whether the request originates from a registered customer includes identifying information representing a product desired by the customer, and the step of selecting an information set includes selecting an information set based upon differences between the product desired by the customer and a product currently used by the customer, and differences between a product currently used by the customer and a product previously used by the customer.

11. The method of claim 8, wherein, the customer information comprises attribute information representing attribute of the customer with respect to the product, and the electronic manual selecting step distinguishes the customer based on the attribute information, obtains the electronic manual information sets for the specified product, and further selects the electronic manual files from the obtained electronic manual files, selecting an advanced manual if the customer is an administrator and selecting a basic manual if the customer is an ordinary user.

12. An electronic manual providing method comprising:

generating electronic manual information sets, each set electronically representing the content of a product manual, storing the electronic manual information sets, receiving request information requesting at least one of the stored electronic manual information sets, identifying a requester as the source of the received request information, selecting from the stored electronic manual information sets an electronic manual set for a product used by the identified requester based on a user attribute comprising a skill level, providing the selected stored electronic manual information set to the requester, determining whether the customer desires to see a difference between a product previously used by the customer based on the request and another product currently used by the customer, and providing electronic manual representing the difference if it is determined that the customer desires to see the difference, showing the manual of the product based on the request prior to the other manual of other product or so that the electronic manual of the product is visually distinguishable from the manual of the other product.

13. An apparatus for providing an electronic manual, comprising:

a connector configured to connect the apparatus to a terminal via a communication network, a storage unit configured to store information sets, each of the sets electronically describes the content of a manual for a product, a memory configured to store customer information regarding a customer in association with product information representing a product being used by the customer, a manual receiver which control the connector to receive manual request information sent from the terminal via the communication network, a identifier configured to determine whether a sender of the manual request information received by the manual receiver is the customer registered in the customer information, a selector configured to select the electronic manual information sets from the electronic manual storage unit in accordance with the manual request when the identifier determines that the sender of the manual request information is the customer, and a provider configured to control the connector to provide the electronic manual information sets selected by the selector to the terminal via the communication network, wherein the selector determines whether the customer desires to see a difference between a product previously used by the customer based on the request and another product currently used by the customer and automatically selects the electronic manual information sets based on a user attribute comprising a skill level, and the provider provides the electronic manual representing the difference if it is determined that the customer desires to see the difference, with showing the electronic manual of the product based on the request prior to the other manual of the other product or so that the electronic manual of the product is visually distinguishable from the manual of the other product.

14. The apparatus of claim 13, wherein the provider provides the electronic manual information sets selected by the selector to the terminal so that the information representing the electronic manual is visually distinguishable from other information.

15. A system for providing an electronic manual, the system comprising a server and a plurality of terminals interconnected via a communication network, the server comprising:

a storage unit configured to store a plurality of electronic manual information sets, each of the sets describing the content of a product manual, a receiver configured to receive, via the communication network, request information from a terminal requesting an electronic manual, a memory configured to store customer information and associated product information, the customer information representing registered customers and the product information representing products used by the registered customers, an identifier configured to determine, based on customer information stored in the memory, whether request information received by the receiver was sent by a registered customer, a selector configured to select, from the storage unit, the electronic manual information set of a product represented by product information stored in association with the customer information when the identifier determines that request information received by the receiver was sent by a registered customer wherein the manual information set is automatically selected based on a user attribute comprising a skill level, wherein the selector determines whether the customer desires to see a difference between a product previously used by the customer and another product currently used by the customer, and a provider configured to provide to the terminal requesting an electronic manual, via the communication network, the electronic manual information set selected by the selector, wherein the provider provides the electronic manual information set selected by the selector to the terminal so that the information representing the electronic manual is visually distinguishable from other information.

16. The system according to claim 15, wherein the provider provides the electronic manual representing differences between the product currently used by the customer and the product used by the customer before.

17. The system according to claim 15, wherein the provider provides the electronic manual representing differences between the product desired by the customer and the product currently used by the customer.

18. The method according to claim 12, wherein providing the electronic manual representing differences between the product currently used by the customer and the product used by the customer before.

19. The method according to claim 12, wherein providing the electronic manual representing differences between the product desired by the customer and the product currently used by the customer.

20. The apparatus according to claim 13, the provider provides the electronic manual representing differences between the product currently used by the customer and the product used by the customer before.

21. The apparatus according to claim 13, the provider provides the electronic manual representing differences between the product desired by the customer and the product currently used by the customer.

22. A system for providing an electronic manual, the system comprising a server and a plurality of terminals interconnected via a communication network, the server comprising:

a storage unit configured to store a plurality of electronic manual information sets, each of the sets describing the content of a product manual, a receiver configured to receive, via the communication network, request information from a terminal requesting an electronic manual, a memory configured to store customer information and associated product information, the customer information representing registered customers and the product information representing products used by the registered customers, an identifier configured to determine, based on customer information stored in the memory, whether request information received by the receiver was sent by a registered customer, a selector configured to select, from the storage unit, the electronic manual information set of a product represented by product information stored in association with the customer information when the identifier determines that request information received by the receiver was sent by a registered customer wherein the manual information set is automatically selected based on a user attribute comprising a skill level, and a provider configured to provide to the terminal requesting an electronic manual, via the communication network, the electronic manual information set selected by the selector, wherein, based on the request, the selector determines whether the customer desires to see a difference between a product previously used by the customer and another product currently used by the customer, and the provider provides the electronic manual representing the difference if it is determined that the customer desires to see the difference, showing the electronic manual of the product based on the request prior to the manual of the other product or so that the electronic manual of the product is visually distinguishable from the manual of the other product, and wherein the provider the provided electronic manual includes movie images or image sets comprising a plurality of images for providing instructional teaching.

* * * * *